United States Patent
Salameh et al.

(10) Patent No.: US 9,766,870 B2
(45) Date of Patent: Sep. 19, 2017

(54) BUNDLE PACKAGE GENERATION

(71) Applicant: MICROSOFT TECHNOLOGY LICENSING, LLC, Redmond, WA (US)

(72) Inventors: Jason Salameh, Bothell, WA (US); Erik Fortune, Jr., Redmond, WA (US); Phillip Smith, Renton, WA (US); John Michael Sheehan, Sammamish, WA (US); Simon Leet, Redmond, WA (US); Letao Wang, Seattle, WA (US); Sarjana Sheth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 13/906,154

(22) Filed: May 30, 2013

(65) Prior Publication Data
US 2014/0359604 A1 Dec. 4, 2014

(51) Int. Cl.
*G06F 9/445* (2006.01)
*G06F 9/44* (2006.01)

(52) U.S. Cl.
CPC . *G06F 8/61* (2013.01); *G06F 8/60* (2013.01)

(58) Field of Classification Search
CPC ..................................... G06F 8/60; G06F 8/61
USPC ........................................................ 717/177
See application file for complete search history.

(56) References Cited

U.S. PATENT DOCUMENTS

| 5,917,912 A | 6/1999 | Ginter et al. |
| 6,021,491 A | 2/2000 | Renaud |
| 6,397,381 B1 | 5/2002 | Delo et al. |
| 6,675,382 B1 * | 1/2004 | Foster .......................... 717/177 |

(Continued)

FOREIGN PATENT DOCUMENTS

| EP | 2003852 A1 | 12/2008 |
| WO | 2007070295 A2 | 4/2007 |
| WO | 2007044230 A1 | 6/2007 |

OTHER PUBLICATIONS

Int. Search Report cited in PCT Application No. PCT/US2013/060933 dated Mar. 21, 2014, 12 pgs.

(Continued)

*Primary Examiner* — Marina Lee
(74) *Attorney, Agent, or Firm* — Workman Nydegger

(57) ABSTRACT

One or more techniques and/or systems are provided for generating a bundle package, digitally signing the bundle package, selectively disturbing the bundle package, and/or indexing one or more resource packages retrieved from the bundle package. That is, a bundle package (e.g., an application or game bundle package) comprises one or more app packages comprising application code configured to execute on various computing environments (e.g., operating systems, processors, etc.). The bundle package may comprise one or more resource packages comprising supplemental data used to provide optional user experience functionality for the application (e.g., French language support, high resolution textures, a gaming pad support, etc.). In this way, a client device may selectively download portions of the bundle package that may be relevant, which may mitigate download bandwidth, storage space, or resources otherwise used to obtain unnecessary portions of the bundle package (e.g., a tablet device may merely download low resolution textures).

23 Claims, 20 Drawing Sheets

(56) References Cited

U.S. PATENT DOCUMENTS

| | | | |
|---|---|---|---|
| 6,879,988 B2* | 4/2005 | Basin ................ G06F 17/30153 |
| 7,124,289 B1* | 10/2006 | Suorsa .............................. 713/1 |
| 7,472,140 B2 | 12/2008 | Agarwal et al. |
| 7,478,361 B2 | 1/2009 | Peteanu et al. |
| 7,486,294 B2 | 2/2009 | Beda et al. |
| 7,676,513 B2 | 3/2010 | McSherry et al. |
| 8,132,176 B2 | 3/2012 | Bissett et al. |
| 8,171,512 B2 | 5/2012 | Song |
| 8,185,872 B2* | 5/2012 | Harmsen et al. ............. 717/121 |
| 8,230,482 B2 | 7/2012 | Peterson et al. |
| 8,267,793 B2 | 9/2012 | Engolz et al. |
| 8,351,965 B2* | 1/2013 | Provo ....................... G06F 8/65 |
| | | 455/412.1 |
| 8,370,830 B2 | 2/2013 | Jimenez-Salgado et al. |
| 8,396,759 B2 | 3/2013 | Mehta et al. |
| 8,433,929 B2* | 4/2013 | Yamashita ............... G06F 21/31 |
| | | 713/156 |
| 8,495,570 B2* | 7/2013 | Fortune ............. G06F 17/30911 |
| | | 717/107 |
| 8,572,580 B2* | 10/2013 | Sheehan et al. ............. 717/131 |
| 8,667,480 B1* | 3/2014 | Sigurdsson ................ G06F 8/65 |
| | | 717/168 |
| 8,694,981 B2* | 4/2014 | Federighi et al. ............ 717/164 |
| 8,707,284 B2* | 4/2014 | Leonard ..................... G06F 8/20 |
| | | 717/163 |
| 8,839,234 B1* | 9/2014 | Voronkov et al. ........... 717/176 |
| 9,021,434 B2* | 4/2015 | Fortune ............. G06F 17/30911 |
| | | 717/121 |
| 9,323,514 B2* | 4/2016 | Constable ................ G06F 8/61 |
| 9,495,371 B2* | 11/2016 | Fortune ............. G06F 17/30091 |
| 2002/0013772 A1 | 1/2002 | Peinado |
| 2002/0038451 A1 | 3/2002 | Tanner et al. |
| 2003/0037327 A1* | 2/2003 | Cicciarelli et al. ........... 717/178 |
| 2003/0200168 A1* | 10/2003 | Cullen et al. ..................... 705/37 |
| 2003/0212990 A1* | 11/2003 | Brodkorb et al. ............ 717/174 |
| 2004/0038740 A1 | 2/2004 | Muir |
| 2004/0060035 A1 | 3/2004 | Ustaris |
| 2004/0194059 A1* | 9/2004 | Akella et al. ................. 717/118 |
| 2005/0149925 A1* | 7/2005 | Pichetti et al. ............... 717/177 |
| 2005/0251682 A1 | 11/2005 | Collins et al. |
| 2006/0053169 A1* | 3/2006 | Straub ................ G06F 17/30864 |
| 2006/0136907 A1* | 6/2006 | Bennett et al. ............... 717/174 |
| 2006/0212923 A1 | 9/2006 | Soneira |
| 2007/0074031 A1 | 3/2007 | Adams et al. |
| 2007/0130073 A1 | 6/2007 | Celli et al. |
| 2007/0168919 A1 | 7/2007 | Henseler et al. |
| 2007/0201655 A1* | 8/2007 | Shenfield ................ 379/201.01 |
| 2007/0250711 A1* | 10/2007 | Storey ........................... 713/168 |
| 2007/0255711 A1 | 11/2007 | Zhou et al. |
| 2008/0127179 A1 | 5/2008 | Moss et al. |
| 2009/0083732 A1 | 3/2009 | Shen et al. |
| 2009/0106748 A1* | 4/2009 | Chess et al. ................... 717/168 |
| 2009/0249326 A1* | 10/2009 | Ridley ........................ G06F 8/61 |
| | | 717/174 |
| 2009/0271782 A1 | 10/2009 | Ciudad et al. |
| 2009/0300596 A1* | 12/2009 | Tyhurst et al. ............... 717/173 |
| 2009/0328028 A1* | 12/2009 | O'Rourke et al. ............ 717/173 |
| 2010/0037207 A1* | 2/2010 | Chambers et al. ........... 717/121 |
| 2010/0082974 A1 | 4/2010 | Sheth et al. |
| 2010/0138930 A1 | 6/2010 | Little et al. |
| 2010/0138933 A1* | 6/2010 | Yamashita ............... G06F 21/31 |
| | | 726/30 |
| 2011/0154284 A1* | 6/2011 | Leonard ..................... G06F 8/20 |
| | | 717/100 |
| 2012/0159260 A1* | 6/2012 | Fortune ................. G06F 9/4448 |
| | | 714/38.1 |
| 2012/0159470 A1* | 6/2012 | Yang ............................ 717/175 |
| 2012/0166513 A1* | 6/2012 | Fortune ............. G06F 17/30091 |
| | | 709/201 |
| 2012/0167111 A1* | 6/2012 | Fortune ............. G06F 17/30911 |
| | | 718/104 |
| 2012/0215562 A1 | 8/2012 | James et al. |
| 2012/0216292 A1* | 8/2012 | Richardson et al. ........... 726/27 |
| 2012/0233239 A1* | 9/2012 | Urim et al. ................... 709/203 |
| 2012/0246482 A1 | 9/2012 | Sherkin et al. |
| 2012/0272204 A1* | 10/2012 | Olewski .................... G06F 8/71 |
| | | 717/100 |
| 2012/0324211 A1 | 12/2012 | Chen et al. |
| 2012/0324434 A1 | 12/2012 | Tewari et al. |
| 2013/0031542 A1 | 1/2013 | Arcilla et al. |
| 2013/0067180 A1 | 3/2013 | Leet et al. |
| 2013/0067587 A1 | 3/2013 | Leet et al. |
| 2013/0111460 A1* | 5/2013 | Mohamed et al. ........... 717/172 |
| 2013/0290930 A1* | 10/2013 | Fortune ............. G06F 17/30911 |
| | | 717/121 |
| 2014/0109078 A1* | 4/2014 | Lang et al. ................... 717/172 |
| 2014/0298318 A1* | 10/2014 | Ahn et al. ..................... 717/174 |
| 2014/0325502 A1* | 10/2014 | Zarifis et al. ................. 717/177 |
| 2014/0357357 A1* | 12/2014 | Boyd ...................... A63F 13/00 |
| | | 463/31 |
| 2014/0359601 A1* | 12/2014 | Constable ................. G06F 8/61 |
| | | 717/175 |
| 2014/0359604 A1* | 12/2014 | Salameh ................... G06F 8/60 |
| | | 717/177 |
| 2014/0359605 A1* | 12/2014 | Leet ........................... G06F 8/61 |
| | | 717/178 |
| 2014/0359606 A1* | 12/2014 | Salameh ................... G06F 8/61 |
| | | 717/178 |
| 2014/0372998 A1* | 12/2014 | Salameh ................... G06F 8/65 |
| | | 717/169 |
| 2015/0234653 A1* | 8/2015 | Fortune ..................... G06F 8/71 |
| | | 717/121 |
| 2016/0309003 A1* | 10/2016 | Boyd ...................... A63F 13/00 |

OTHER PUBLICATIONS

Int. Search Report cited in PCT Application No. PCT/US2013/060946 dated Apr. 1, 2014, 10 pgs.

Int. Search Report cited in PCT Application No. PCT/US2013/060251 dated May 2, 2014, 14 pgs.

"Performance Evaluation of a Generic Deployment Infrastructure for Comonent-based S/W Engineering", Abdelkrim Benamar and Noureddine Belkhatir, Oct. 2011, ICSEA 2011: the Sixth Int. Conference on Software Engineering Advances, reprinted from the Internet at: http://www.google.com/url?urlhttp://www.thinkmind.org/download.php%3Farticleid%3Dicsea_2011_16_30_10190%rct=j%frm=1%q-%esrc=s%sa=U%wj-3UGrUSONDcOgqAbuoCABA%ved=OCBsQFjAB%usg=AB%usg=AFQjCNFsH7wsUY9eSqkvKrsDIWLvv9yaRQ, 6 pgs.

"A Generic Approach for Deploying and Upgrading Mutable Software Components", Sander Van Der Burg, Jun. 3, 2012, In Proceedings of the Fouirth Workshop on Hot Topics in Software Upgrades, reprinted from the Internet at: http://www.st.ewi.tudelft.nl/~sander/pdf/publications/vanderburg12-mutable.pdf, 5 pgs.

Protecting Code Archives with Digital Signatures, Pierre Parrend, Jan. 14, 2008, reprinted from the Internet at: https://www.owasp.org/index.php/Protecting_code_archives_with_digital_signatures, 5 pgs.

"Code Signing Guide", Apr. 23, 2013, reprinted from the Internet at: https://developer.apple.com/library/mac/documentation/security/Conceptual/CodeSigningGuide/CodeSigningGuide.pdf, 37 pgs.

App Packages and Deployment (Windows Store apps), Apr. 23, 2012, reprinted from the Internet at: http://msdn.microsoft.com/en-us/library/windows/apps/hh464929.aspx, 15 pgs.

WebAware Installation Technology, Apr. 23, 2013, reprinted from the Internet at: http://www.installaware.com/web-deployment-partial-web-deployment.htm, 2 pgs.

"Introduction to Application Management in Configuration Manager", Mar. 1, 2013, reprinted from the Internet at: http://technet.microsoft.com/en-US/en=us/library/gg682125.aspx, 9 pgs.

"Bundle Programming Guide", Mar. 1, 2013, reprinted from the Internet at: https://developer.apple.com/library/ios/documentation/CoreFoundation/Conceptual/CFBundles/CFBundles.pdf, 53 pgs.

"Resource Managaement System", Apr. 22, 2013, reprinted from the Internet at: http://msdn.microsoft.com/en-us/library/windows/apps/jj552947.aspx, 7 pgs.

(56) References Cited

OTHER PUBLICATIONS

Optimal Resource-Aware Deployment Planning for Component-based Distributed Applications, Tatiana Kichkaylo and Vjay Karamcheti, Jun. 4, 2004, In 13th IEEE International Symposium on High Performance Distritubed Computing, reprinted from the Internet at: http://ieeexplore.ieee.org/xpl/login.jsp?tp=&arnumber=1323517&url=http%3A%2F%2Fieeexplore.ieee.org%2Fiel5%2F9239%2F29284%F01323517.pdf%3Farnumber%3D1323517, 10 pgs.

"Offloading Android Applications to the Cloud without Customizing Android", Eric Chen, Satoshi Ogata and Keitaro Horikawa, Mar. 19, 2012, Eighth IEEE PerCom Workshop on Purvasive Wireless Networking 2012, Lugano, pp. 788-793.

"Security Mechanism Analysis of Open-Source: Android 0S and Symbian OS", Hou Rui, Jin Zhi Gang and Wang Bao Liang, Apr. 21, 2012, Second International Conference on Consumer Electronics, Communications and Networks, pp. 3497-3501.

"Resource Files", May 25, 2010, reprinted from the internet at: http://msdn.microsoft.com/en-us/library/cc296240(v=vs.95).aspx, 3 pgs.

"Resource (Windows)", May 19, 2013, reprinted from the Internet at: http://en.wikipedia.org/w/index.php?title=Resource_(Windows)&oldid=555817209, 2 pgs.

"Application Structure", May 17, 2010, reprinted from the Internet at: https://web.archive.org/web/20100517040612/http://msdn.microsoft.com/en-us/library/cc838120(VS.95).aspx, 3 pgs.

Non-Final Office Action cited in U.S. Appl. No. 13/905,554 dated Jan. 30, 2015, 27 pgs.

Int. Search Report cited in PCT Application No. PCT/US2013/061084 dated Jul. 24, 2014, 11 pgs.

Written Opinion cited in PCT Application No. PCT/US2013/060946 dated Oct. 20, 2014, 6 pgs.

Reply Written Opinion cited in PCT Application No. PCT/US2013/060946 dated Jan. 19, 2015, 10 pgs.

"Office Action Issued in European Patent Application No. 13779652.0", Mailed Date: Sep. 15, 2016, 4 Pages.

"Second Written Opinion Issued in PCT Application No. PCT/US2013/060251", Mailed Date: Mar. 31, 2015, 4 Pages.

"International Preliminary Report on Patentability Issued in PCT Application No. PCT/US2013/060251", Mailed Date: Jun. 24, 2015, 7 Pages.

\* cited by examiner

BUNDLE PACKAGE GENERATION

BACKGROUND

Many users utilize applications to perform a variety of activities, such as checking email, playing video games, sharing photos, interacting through social networks, banking, and/or a plethora of other activities. Because users may execute such applications through various devices and/or computing environments, an application developer may create an application deployment package that supports multiple processors, operating systems, languages, display scales, resolutions, graphics cards, etc. Thus, the application deployment package may comprise a relatively large amount of data all of which may not be used by a particular device or computing environment. For example, a user may download a drawing application from an app marketplace onto a tablet device. The drawing application may comprise medium resolution textures that may work well with the tablet device, but may also comprise low resolution textures meant for smaller smart phones and high resolution textures meant for personal computers. The drawing application may comprise support for 10 languages. The tablet device may utilize the medium resolution textures and a language used by the user, but may not utilize the low resolution textures, the high resolution textures, and the other 9 languages. Such unused features of the drawing application may unnecessarily consume download bandwidth, storage space, and computing resources during download, deployment, and execution of the drawing application on the tablet device.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for generating a bundle package for an application; digitally signing the bundle package; selectively retrieving portions of the bundle package; indexing resource packages associated with the application; and distributing and installing a game bundle package for a game are provided herein.

In some embodiments of generating a bundle package for an application, one or more app packages may be identified for inclusion within a bundle package for an application. A first app package may comprise first application code (e.g., an executable binary file) configured to execute on a first computing environment, such as a particular computer architecture (e.g., a first processor architecture, a second, different processor architecture, etc.) and/or a particular operating system (e.g., a tablet operating system, a desktop operating system, a cloud-based operating system, etc.). One or more resource packages may be identified for inclusion within the bundle package. A resource package may comprise optional user experience functionality for the application (e.g., resolution texture data, language data, multimedia application program interface (API) version data such as DirectX®, region related data that may be loaded by modern resource technology (MRT) and/or any other resources, data, etc. that may be used to facilitate tailoring a user's experience, etc.). For example, a first resource package may comprise first supplemental data used to provide first user experience functionality for the application. The bundle package may be generated to comprise the one or more app packages and the one or more resource packages. In this way, an app package and/or one or more resource packages may be selectively downloaded for installation of the application (e.g., a tablet device may download a first processor architecture app package and a medium resolution texture resource package).

In some embodiments of digitally signing a bundle package, a first digital signature operation is performed for a bundle package associated with an application. The bundle package comprises a first app package and a first resource package. In an example, the bundle package comprises one or more app packages and/or one or more resource packages. The digital signature operation may be performed (e.g., performed as a single signing operation using a single digital signing certificate) to digitally sign the first app package, the first resource package, and the bundle package. For example, the first app package is signed with a first app package signature utilizing the digital signing certificate, the first resource package is signed with a first resource package signature utilizing the digital signing certificate, and the bundle package is signed with a bundle package signature utilizing the digital signing certificate. Because the digital signature operation signs the first app package, the first resource package, and the bundle package using the same digital signing certificate (e.g., and/or through a single signing operation), a set of signature properties may be shared by the first app package signature, the first resource package signature, and/or the bundle package signature (e.g., a digital signing certificate owner, a chain certification of authority, a key usage, a signature validate date, encryption strength, and/or timestamp). In this way, the bundle package and/or portions thereof may be selectively and/or separately downloaded by a client device, and authenticated by the client device in an efficient manner based upon the shared signature properties.

In some embodiments of selectively retrieving portions of a bundle package associated with an application, a bundle package associated with an application for installation may be identified. For example, the bundle package may be associated with a photo sharing applicable available for download through an app marketplace. An applicability context for the application to execute on a client device may be determined. For example, the applicability context may specify a resolution, a screen scale, a set of languages of interest, a multimedia API feature set, a graphics processing unit (GPU), or other user experience context for the client device (e.g., an applicability context for a smart phone of a German speaking user may differ from an applicability context for a desktop of an English speaking user based upon language, hardware capabilities, display capabilities, etc.). A first app package may be selectively retrieved from the bundle package based upon the first app package comprising application code corresponding to a computing environment context (e.g., a processor architecture, an operating system type, etc.) specified by the applicability context. Responsive to the applicability context corresponding to a first resource package within a set of resource packages of the bundle package, the first resource package may be selectively retrieved from the bundle package (e.g., a German language resource package may be retrieved for the smart phone). In this way, one or more resource packages corresponding to the applicability context may be selectively retrieved, while resource packages not corresponding to the applicability context are not retrieved (e.g., high resolution gaming textures may not be retrieved for the smart phone, which, if retrieved, may unnecessarily consume download bandwidth and/or require storage of portions/features of the application that are not usable by the smart phone).

In some embodiments of indexing resource packages for an application on a client device, a first resource package and a second resource package are identified on a client device. In an example, the first resource package and the second resource package may have been selectively and/or individually downloaded for the application, and thus may be initially stored on the client device without a logical relationship specifying how the first resource package and the second resource package may be used to provide a tailored user experience for the application. The first resource package comprises first supplemental data used to provide first optional user experience functionality for the application (e.g., one or more German text strings used to provide a German language user interface experience for a social network app). The second resource package comprises second supplemental data used to provide second optional user experience functionality for the application (e.g., one or more French text strings used to provide a French language user interface experience for the social network app).

A first resource index for the first resource package may describe first resource data (e.g., the one or more German language strings) and/or first resource applicability data (e.g., use German language data to display text for a German speaking user) for the first resource package. A second resource index for the second resource package may describe second resource data (e.g., the one or more French language strings) and/or second resource applicability data (e.g., use French language data to display text for a French speaking user) for the second resource package. The first resource index and the second resource index may be merged into a merged resource index. The merged resource index may describe individual resources within the first resource package and/or the second resource package, such as the German text strings and/or French text strings. The merged resource index may be evaluated to selectively utilize one or more resources for execution of the application. In an example, a reference to the merged index may be created within an app package for the social network app. Upon execution of the social network app using the app package, the merged index may be consulted using the reference to identify which resources are available and/or are relevant to execute the social network app (e.g., a welcome message text string in German within the first resource package may be relevant for a welcome message window for a current user who speaks German; a high contrast user interface element within a high contrast display resource package may be relevant when a current display setting is set to a high contrast mode; etc.).

In some embodiments of distributing a game via a game bundle package, a game bundle package for a game may be generated. The game bundle package may comprise one or more core game packages. A first core game package comprises game code (e.g., an executable binary file) configured to executed on a first computing environment (e.g., an x86 processor). The game bundle package may comprise one or more resource game packages. A first resource game package may comprise first supplemental hardware-aware data used to provide first optional user experience functionality for the game (e.g., texture imagery, terrain data, character geometry, and/or other game visualization data at a particular display quality). The one or more core game packages and/or the one or more resource game packages may be exposed for selective download and/or install of the game. In this way, a client device may selectively download certain resource game packages that may provide a desirable gamming experience on the client device (e.g., a tablet device may download medium quality textures to conserve download bandwidth and/or storage space, whereas a PC may download high quality textures).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
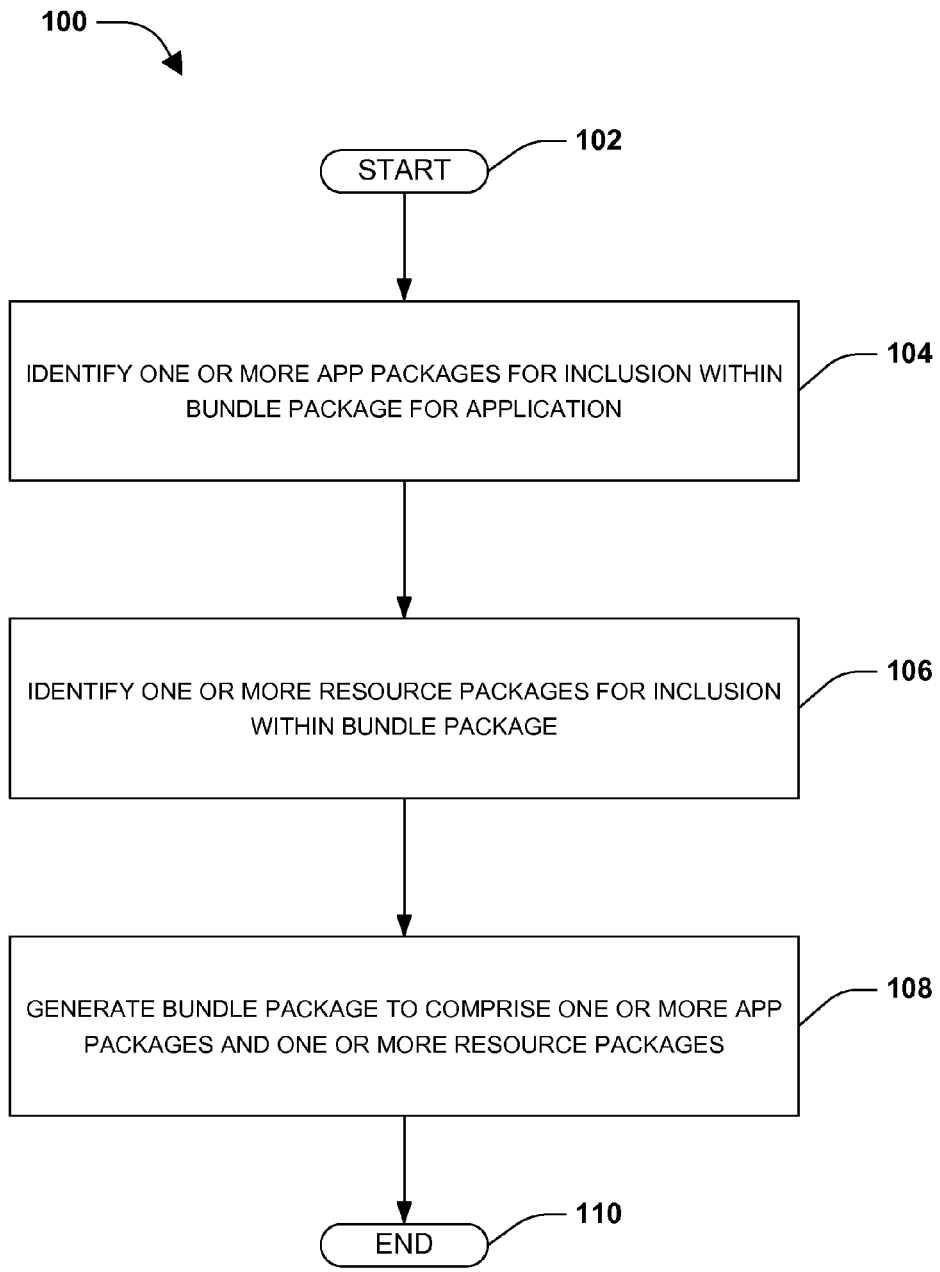
FIG. 1 is a flow diagram illustrating an exemplary method of generating a bundle package for an application.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

As provided herein software components, such as resource packages, app packages, etc., may be selectively provided, with little to no duplication, to an end user machine, such that the end user machine is merely provided with software components used by the end user machine without the end user machine having to download, store, and/or install unnecessary software components. For example, end user machines, such as client devices, may comprise a wide variety of software and/or hardware characteristics (e.g., a tablet may comprise a processor, operating system, graphics processing unit, and/or a variety of characteristics that are different than a desktop gaming device). To provide a desirable experience on such client devices, many apps may customize application assets (e.g., textures, strings, images, user interface elements, and/or other software components of a particular app) for respective client devices. Unfortunately, this may be problematic for developers and/or users because a developer may spend substantial time and/or resources creating separate installation packages for such a large variety of client devices. Alternatively, the developer may create a single installation package that comprises all of the applications assets, which may place the burden on the user and/or client device to download and/or store an abundance of application assets where merely a (e.g., small) portion of the application assets are utilized by the client device.

Accordingly, as provided herein, for respective application assets of an app (e.g., assets within resource packages and/or app packages), a developer may identify characteristics of a client device that may be used to select software components for download to the client device (e.g., selectively download resource packages and/or app packages). In an example, app packages may comprise app binaries and/or executables that may depend on architecture of CPUs in client devices (e.g., x86, x64, etc.). In another example, graphics resource packages may comprise texture and/or shader application assets that may depend on a level or generation of graphics processing units in client devices (e.g., a DX9, DX10, or DX11). In another example, user interface resource packages may comprise dialog boxes and/or other user interface element assets that may depend on display resolution of client devices (e.g., monitor DPI such as 96*1.0, *1.4, or *1.8). In another example, texture resource packages may comprise instructional assets that may depend on languages of client devices.

The developer may submit the application assets, and may label the application assets by characteristics of client devices. A software distribution system may on-board such information from the developer for retrieval by client devices. When an installation occurs on a client device, device characteristics of the client device are identified. An installer may install a set of application assets (e.g., comprised within one or more resource packages) that match the device characteristics of the client device, and may refrain from installing application assets that do not match. In this way, the developer may merely provide an application asset once for installation by client devices, and the user may merely download and/or install application assets on the client device that are to be used by the client device.

An embodiment of generating a bundle package for an application is illustrated by an exemplary method 100 of FIG. 1. At 102, the method starts. At 104, one or more app packages may be identified for inclusion within a bundle package for an application. For example, a first app package may comprise first application code configured to execute on a first computing environment (e.g., a first processor type, a tablet operating system, etc.), a second app package may comprise second application code configured to execute on a second computing environment (e.g., a second processor type, a desktop operating system, etc.), etc. In this way, the application may support various computing environments such as computer architectures or operating systems based upon the one or more app packages. In an example, an app package may comprise an executable binary file that may be executed to run a core version of the application on a client device. Because the application may support a wide variety of optional user experience functionality for the application, such functionality may be separated out from the one or more app packages, and may be exposed for selective and/or optional download separate from the application code. In this way, the client device may merely download optional functionality that may be relevant to the client device or user of the client device (e.g., support for a particular language of the user, high resolution textures for a gaming device, low resolution textures for a tablet device, etc.). Accordingly, such optional user experience functionality may be provided through resource packages.

At 106, one or more resource packages may be identified for inclusion within the bundle package. For example, a first resource package may comprise first supplemental data (e.g., texture data, icon data, strings in a particular language, multimedia API functionality, images at a particular resolution, etc.) used to provide first optional user experience functionality for the application; a second resource package may comprise second supplemental data used to provide second optional user experience functionality for the application; etc. It may be appreciated that a resource package is not limited to the examples provided herein, and that a resource package may comprise a wide variety of any one or more resources, such as may be related to language, display functionality, hardware functionality, software functionality, user interface functionality, and/or any other functionality that may be used to tailor a user's experience (e.g., any data that may be loaded by modern resource technology, etc.). In an example, a resource package may comprise optional language user experience functionality for the application. In another example, a resource package may comprise optional user experience functionality that may be tailored to a user (e.g., a preferred user input mode, a high contrast setting, a location of the user, etc.). In another example, a resource package may comprise optional display quality user experience functionality for the application (e.g., resolution data, screen scale data, multimedia API data, etc.). In another example, the resource package may comprise optional hardware-aware functionality that may depend upon hardware capabilities of a client device (e.g., image capture functionality for a client device comprising a camera, audio functionality for a client device comprising a microphone or headset, wireless functionality for a client device comprising a wireless peripheral, etc.). In another example, the resource package comprises content associated with multiple user experience functionality (e.g., a high resolution German image; a high contrast interactive user interface element that utilizes a DX9 functionality set; etc.).

In some embodiments, a resource package may be automatically generated for the application. For example, an app package may be parsed to identify a first set of optional data from the first app package (e.g., the application may natively provide strings in English, but may also comprise strings in French as optional language support). The first set of optional data may be extracted from the first app package. A resource package may be generated based upon the first set of optional data, such as a French language resource package. In an example, a resource package (e.g., automatically generated or not) may comprise multiple instances of a type (e.g., an English language resource package, a United States English language resource package and/or British English language resource package, etc.).

At 108, the bundle package may be generated to comprise the one or more app packages and/or the one or more resource packages. In an example, the bundle package, the one or more app packages, and/or the one or more resource packages may be digitally signed with a digital signing certificate (e.g., during a single digital signing operation) such that the packages may share a set of signature properties (e.g., a digital signing certificate owner, a chain certification of authority, a key usage, a signature validation date, a signature encryption strength, a signature timestamp, etc.), which may allow a client device to efficiently verify the packages regardless of whether the packages were selectively and/or individually downloaded. In an example, a bundle manifest may be generated for inclusion within the bundle package. The bundle manifest may comprise one or more app descriptions for the one or more app packages and/or one or more resource descriptions for the one or more resource packages. In an example, the bundle package may be updated to add, remove, and/or modify app packages and/or resource packages therein. For example, a bundle update may be received for the bundle package. The bundle update may comprise a new resource package for inclusion within the bundle package. The bundle package may be updated to comprise the new resource package, and the bundle manifest may be updated to specify that the new resource package is available for optional retrieval. In an example where the bundle package was certified by an app marketplace certification process (e.g., an automated and/or manual testing process to verify correct functionality and/or compliance with the app marketplace), merely the new resource package may be certified, as opposed to re-certifying the bundle package.

The bundle package may be exposed for selective download through an app marketplace. For example, the one or more resource packages may be exposed as optional downloads for the application. That is, an app package may be downloaded for installation of the application on a client device, and one or more resource packages may be optionally downloaded or deployed to provide optional user experienced functionality for the application (e.g., support for a French language). Accordingly, a bundle acquisition request may be received from a client device. In an example, a bundle acquisition request may specify a first app package.

The first app package may be selectively provided to the client device for installation. In an example, the bundle acquisition request may specify a second resource package within the bundle package. The second resource package, but not a first resource package, may be selectively provided from the bundle package to the client device for installation of the application. In another example, the bundle acquisition request specifies a subset of resource packages comprised within the bundle package. The subset of resource packages may specify at least some but fewer than all of the one or more resource packages within the bundle package. In this way, the subset of resource packages may be selectively provided from the bundle package to the client device for installation of the application. At 110, the method ends.

Figure 2:
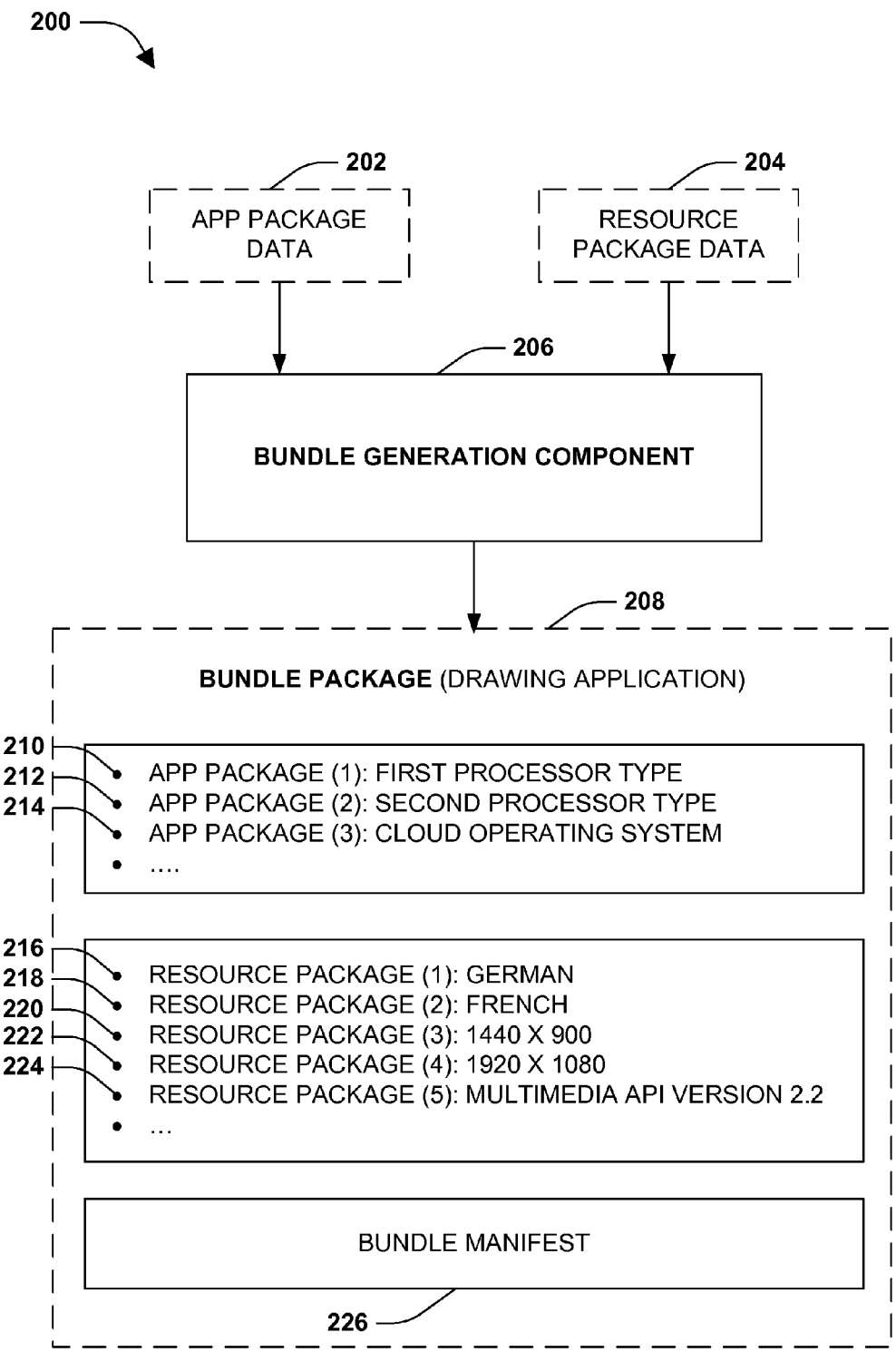
FIG. 2 is a component block diagram illustrating an exemplary system for generating a bundle package.

FIG. 2 illustrates an example of a system 200 for generating a bundle package 208. The system 200 may comprise a bundle generation component 206. The bundle generation component 206 may be configured to identify one or more app packages for an application (e.g., app package data 202 provided by an app developer of a drawing application). The bundle generation component 206 may be configured to identify one or more resource packages for the application (e.g., resource package data 204 provided by the app developer or another source, such as a resource package developer). In an example, the bundle generation component 206 may parse an app package to identify optional data that may be extracted and/or used to generate a resource package. For example, an app package may be parsed to identify a feature set of a multimedia API version 2.2 that may provide optional display functionality for the drawing application, and thus a resource package may be created for the feature set.

The bundle generation component 206 may generate the bundle package 208 for the drawing application to comprise one or more app packages and/or one or more resource packages. For example, the bundle package 208 may comprise a first app package 210 comprising application code configured to execute on a first processor architecture, a second app package 212 comprising application code configured to execute on a second processor architecture, a third app package 214 comprising application code configured to execute on a cloud operating system, and/or other app packages configured to execute on various computer architectures and/or operating systems, for example. The bundle package 208 may comprise a first resource package 216 comprising German language strings, a second resource package 218 comprising French language strings, a third resource package 220 comprising medium quality resolution imagery at 1440×900 (e.g., or a medium quality pixel density), a fourth resource package 222 comprising high quality resolution imagery at 1920×1080 (e.g., a high quality pixel density), a fifth resource package 224 comprising the feature set of the multimedia API version 2.2 (e.g., the fifth resource package 224 may be automatically generated based upon the optional display functionality extracted from the app package), and/or other resource packages comprising supplemental data used to provide optional user experience functionality for the drawing application. The bundle generation component 206 may generate a bundle manifest 226 describing the one or more app packages and/or the one or more resource packages available through the bundle package 208. In this way, the bundle package 208 may be exposed for selective download of the bundle package 208 or portions therein for installation of the drawing application (e.g., FIG. 4).

Figure 3:
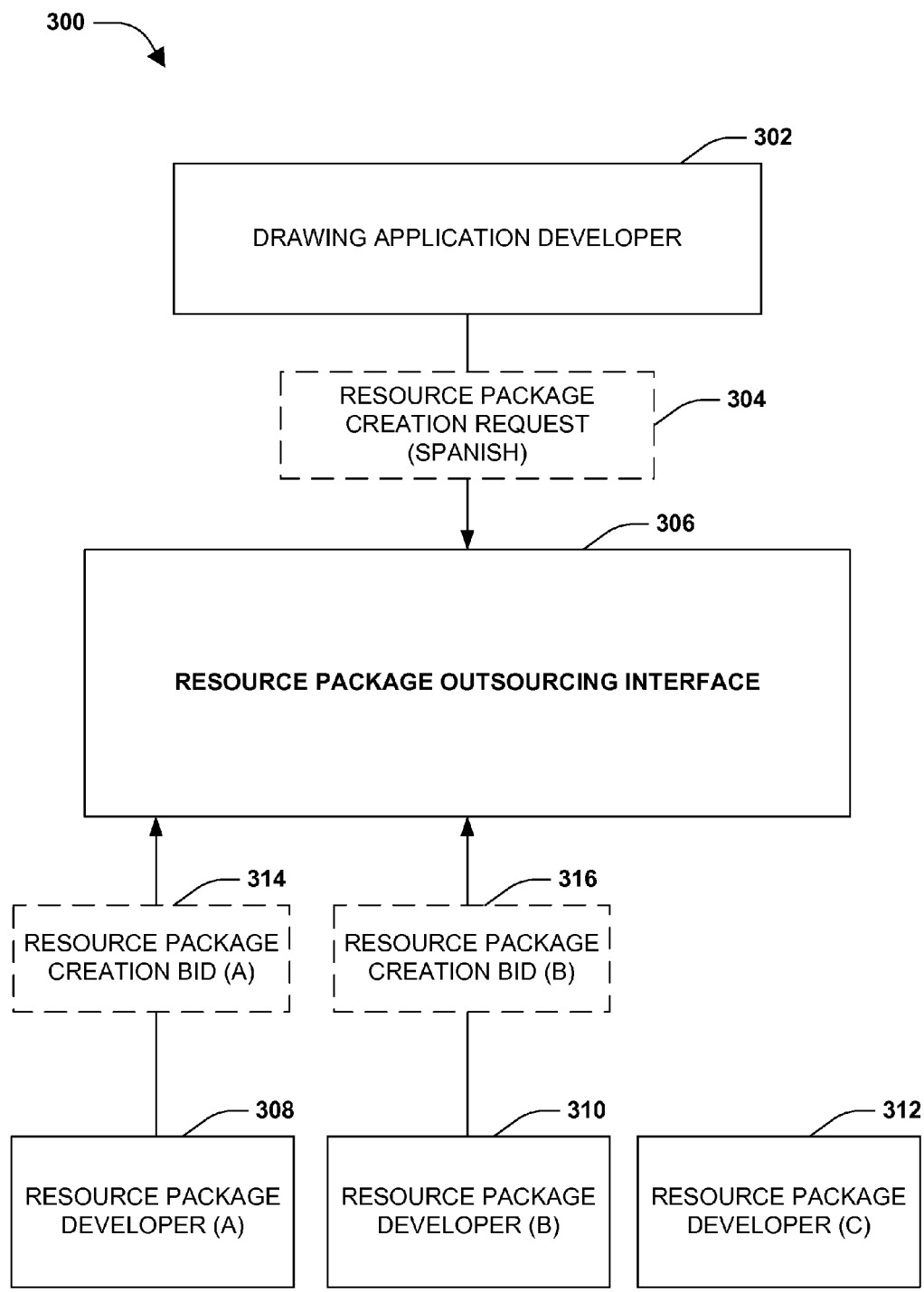
FIG. 3 is an illustration of an example of facilitating a resource package creation transaction.

FIG. 3 illustrates an example 300 of facilitating a resource package creation transaction. That is, an app developer of an application (e.g., a drawing application developer 302 of a drawing application) may create an app package comprising application code configured to execute the drawing application in English. The app package may be certified through an app marketplace certification process, and thus may be bundled into a bundle package and exposed through an app marketplace for download. In an example, the drawing application developer 302 may desire to have the drawing application accessible to Spanish speaking users, but may lack the resources to perform such a translation. Accordingly, a resource package outsourcing interface 306 may be exposed to the drawing application developer 302 (e.g., the drawing application developer 302 may access a website that may host the resource package outsourcing interface 306).

A resource package creation request 304 may be received from the drawing application developer 302 (e.g., a solicitation for creation of a Spanish language resource package). The resource package creation request 304 may be exposed to a plurality of resource package developers through the resource package outsourcing interface. For example, a resource package developer (A) 308, a resource package developer (B) 310, and a resource package develop (C) 312 may access the resource package creation request 304 through the website hosting the resource package outsourcing interface 306. One or more resource package creation bids may be received through the resource package outsourcing interface 306 (e.g., a resource package creation bid (A) 314 from the resource package developer (A) 308 and a resource package creation bid (B) 316 from the resource package developer (B) 310). Responsive to a selection of a resource package creation bid (e.g., selection of the resource package creation bid (B) 316), the resource package creation transaction may be facilitated between the drawing application developer 302 and the resource package developer (B) 310 (e.g., a payment transaction and/or a transfer of a Spanish language resource package may be facilitated). In this way, the Spanish language resource package may be received from the resource package developer (B) 310 for inclusion within the bundle package for the drawing application.

Figure 4:
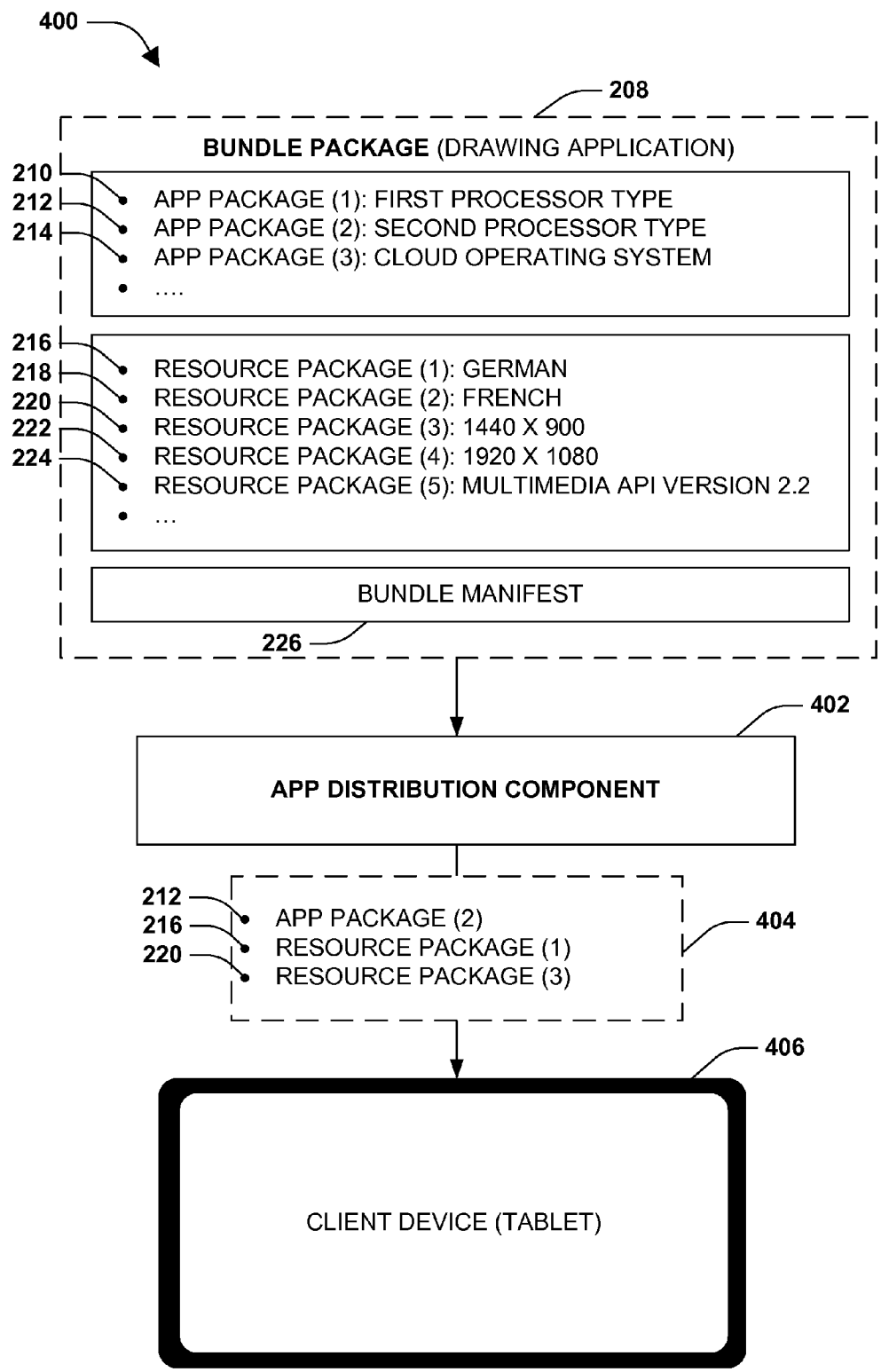
FIG. 4 is a component block diagram illustrating an exemplary system for selectively distributing portions of a bundle package.

FIG. 4 illustrates an example of a system 400 for selectively distributing portions of a bundle package 208. The system 400 may comprise an app distribution component 402 configured to expose one or more app packages (e.g., a first app package 210, a second app package 212, a third app package 214, etc.) and/or one or more resource packages (e.g., a first resource package 216 for German language strings, a second resource package 218 for French language strings, a third resource package for medium resolution textures at 1440×900, a fourth resource package for high resolution textures at 1920×1080, a fifth resource package for a multimedia API version 2.2, etc.) for selective download and/or deployment of a drawing application on a client device 406. For example, the app distribution component 402 may expose a bundle manifest 226 to the client device, such as a tablet device that natively supports a 1440×900 resolution and is used by a German speaking user. The bundle manifest 226 may describe the bundle package 208 such as the one or more app packages and/or the one or more resource packages.

In an example, a bundle acquisition request is received from the client device 406. The bundle acquisition request may specify the second app package 212 because the client device 406 has a second processor architecture that can execute the drawing application using the second app package 212. The bundle acquisition request may specify the first resource package 216 because the user speaks German. In an example, the bundle acquisition request does not specify the second resource package 218 so that the client device 406 does not consume download bandwidth, storage space, and/or computing resources that would otherwise be used to download and deploy the second resource package 218 for the French language not spoken by the user. The bundle acquisition request may specify the third resource package 220 because the client device 406 natively supports 1440× 900 resolution. In an example, the bundle acquisition request does not specify the fourth resource package 222 so that the client device 406 does not consume download bandwidth, storage space, and/or computing resources that would otherwise be used to download and deploy the fourth resource package 222 for a resolution not supported by the client device 406. In this way, the app distribution component 402 selectively provides 404 the second app package 212, the first resource package 216 and/or the third resource package 220 from the bundle package 208 to the client device 406 for installation of the drawing application.

Figure 5:
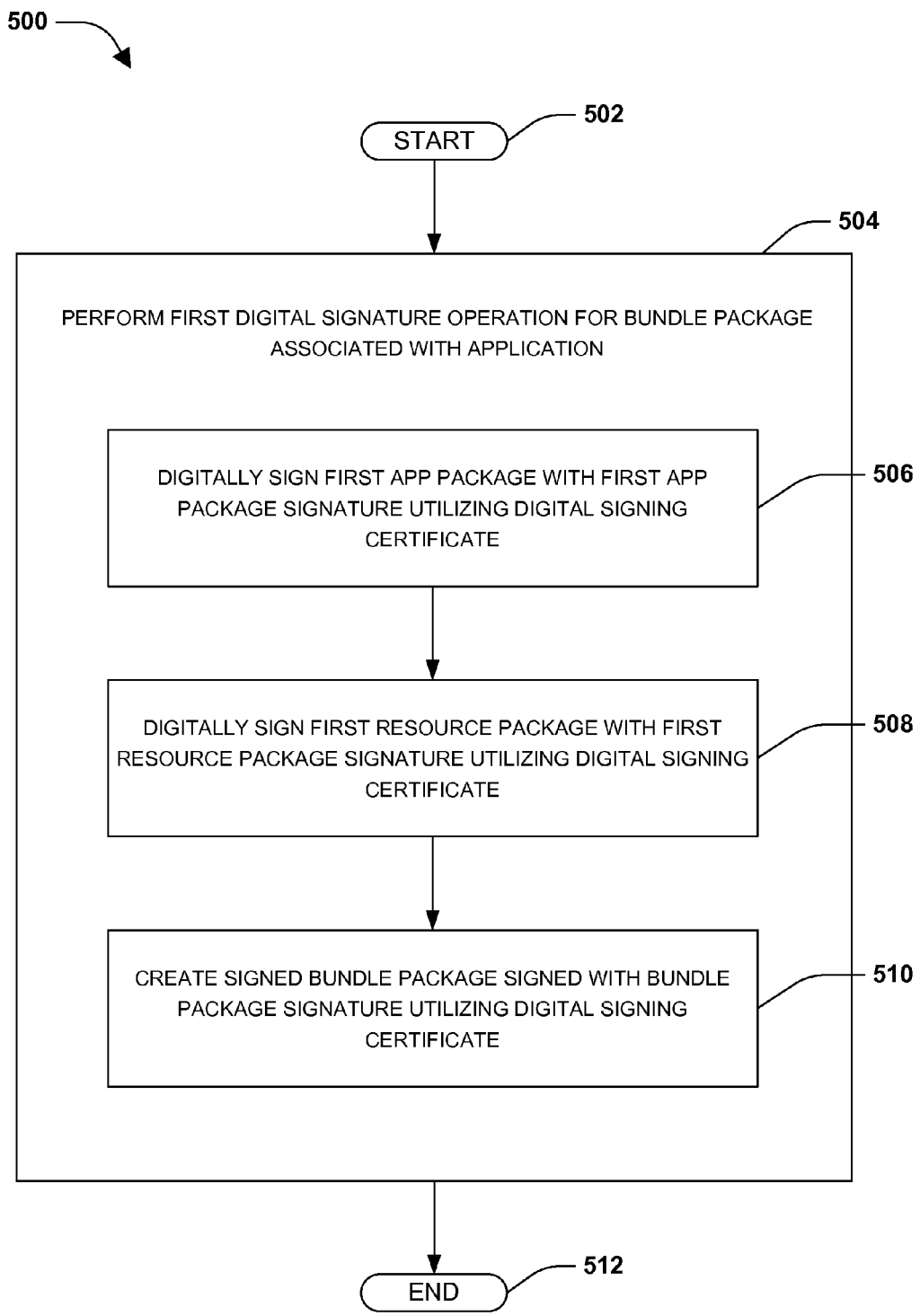
FIG. 5 is a flow diagram illustrating an exemplary method of digitally signing a bundle package.

An embodiment of digitally signing a bundle package is illustrated by an exemplary method 500 of FIG. 5. At 502, the method starts. A bundle package for an application may comprise one or more app packages and/or one or more resource packages. An app package may comprise application code that may be executed to run the application in a particular computing environment (e.g., a first app package may comprise an executable binary file that may be executed by a mobile operating system and/or a second processor architecture). A resource package may comprise supplemental code configured to provide optional user experience functionality for the application. In an example, a first resource package may comprise strings in a German language. In another example, a display resource package may comprise resolution data, screen scale data, multimedia API version data, and/or other data that may provide a tailored visual experience for the application. Because the bundle package, the one or more app packages, and/or the one or more resource packages may be selectively and/or individually downloaded by a client device for installation (e.g., a client device may download the first app package and a second resource package comprising strings in a French language, but may not download the first resource package because a user of the client device does not speak German), a digital signing operation may be performed that signs the bundle package, the one or more app packages, and/or the one or more resource packages with digital signatures having similar signature properties (e.g., a digital signing certificate owner, a chain certification of authority, key usage, signature validation date, signature encryption strength, signature timestamp, etc.). The digital signatures may be used to verify the source of and/or the contents within the bundle package, app packages, and/or resource packages by a client device for installation of the application.

Accordingly, a first digital signature operation is performed for the bundle package, at 504. In an example, the first digital signature operation is performed through a single signing operation utilizing a digital signing certificate (e.g., the same digital signing certificate may be used during the single signing operation to sign the bundle package, the app packages, and/or the resource packages so that such packages comprise similar signature properties that may be efficiently verified by the client device regardless of whether such packages were separately or individually downloaded). The first digital signature operation may comprise digitally signing the first app package with a first app package signature utilizing the digital signing certificate to create a signed first app package, at 506. The first digital signature operation may comprise digitally signing the first resource package with a first resource package signature utilizing the digital signing certificate to create a signed first resource package, at 508. At 510, a signed bundle package, signed with a bundle package signature utilizing the signing certificate, is created (e.g., the bundle package initially comprising the app packages and/or resource packages may be signed; a new bundle package may be created from the signed app packages and signed resource packages and the new bundle package may be signed; etc.). A set of signature properties may be shared by the first app package signature, the first resource package signature, and the bundle package signature.

In some embodiments of signing the first app package and the first resource package, the first app package and the first resource package may be extracted from the bundle package as an extracted first app package and an extracted first resource package. The extracted first app package may be digitally signed to create a signed extracted first app package. The extracted first resource package may be digitally signed to create a signed extracted first resource package. In an example, the signed extracted first app package is returned to the bundled package as the signed first app package, and the signed extracted first resource package is returned to the bundle package as the signed first resource package. In this way the bundle package may be signed to create the signed bundle package. In another example, a new bundle package is created utilizing the signed extracted first app package as the signed first app package and the signed extracted first resource package as the signed first resource package. The new bundle package may be signed utilizing the bundle package signature to create the signed bundle package. In another example, the first app package and/or the first resource package are signed in-place while the first app package and/or the first resource package are comprised within the bundle package.

In some embodiments of signing the one or more app packages and/or the one or more resource packages, the one or more app packages and/or the one or more resource packages may be sequentially signed using the digital signing certificate. In some embodiments of signing the one or more app packages and/or the one or more resource packages, the one or more app packages and/or the one or more resource packages may be signed in parallel. In an example, the first app package and the first resource package may be signed in parallel. In another example, the first app package and a second app package may be signed in parallel. In another example, the first resource package and a second resource package may be signed in parallel.

The signed bundle package may be exposed for download through an app marketplace. The one or more signed resource packages may be exposed as optional downloads for the application. In an example where the signed bundle package comprises the signed first resource package and a signed second resource package, a bundle acquisition request may be received from a client device. The bundle acquisition request may specify the signed first app package and the signed first resource package. The signed first app package and the signed first resource package, but not the signed second resource package, may be selectively provided to the client device for signature validation and installation of the application. At 512, the method ends.

Figure 6:
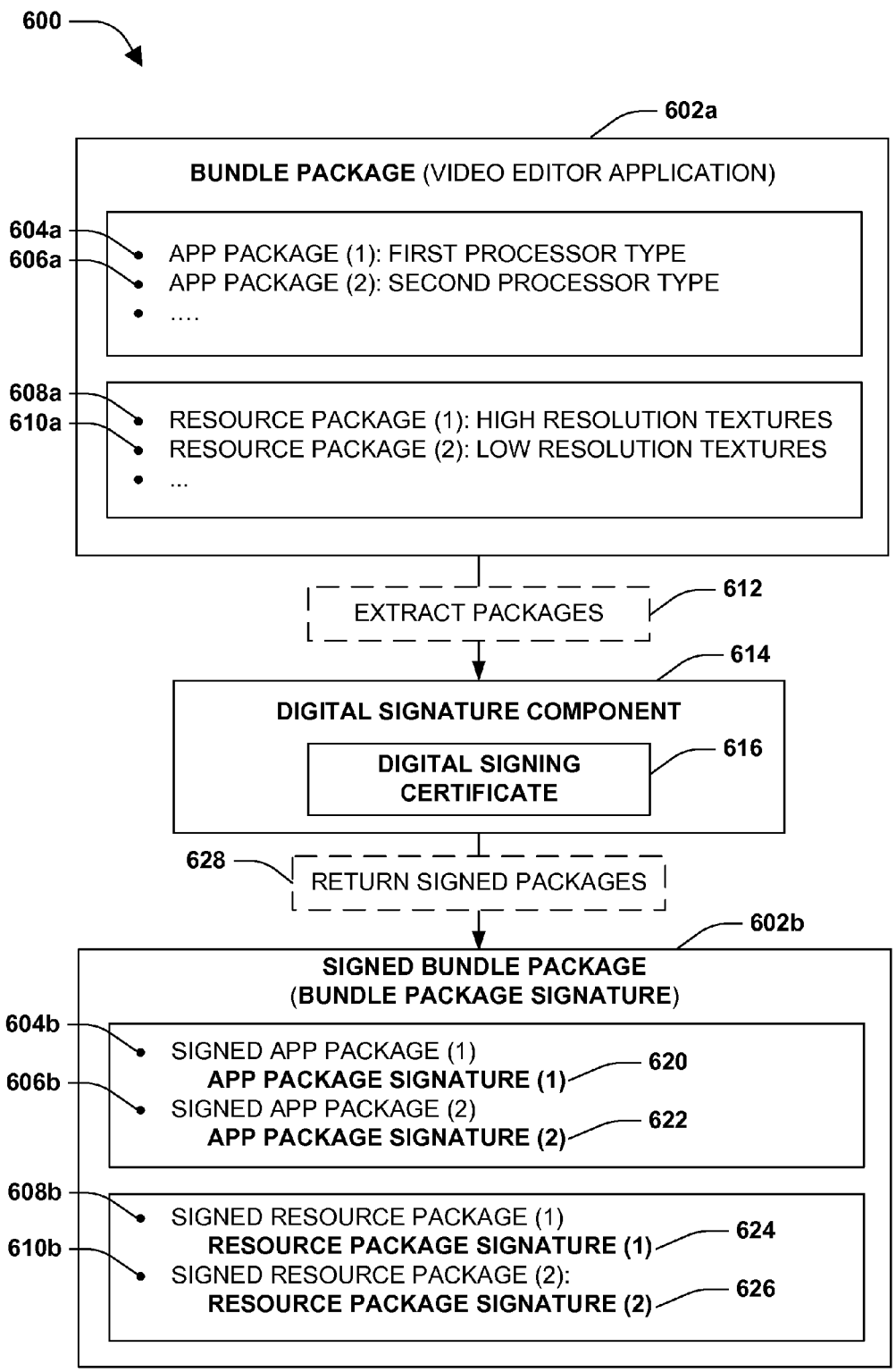
FIG. 6 is a component block diagram illustrating an exemplary system for signing a bundle package utilizing an extraction technique.

FIG. 6 illustrates an example of a system 600 for signing a bundle package utilizing an extraction technique. The system 600 comprises a digital signature component 614. The digital signature component 614 may be configured to perform a digital signature operation (e.g., a single signing operation) utilizing a digital signing certificate 616 to digitally sign the bundle package (e.g., a bundle package 602a for a video editor application before being digitally signed) and/or packages therein. For example, the digital signature component 614 may extract 612 a first app package 604a, a second app package 606a, a first resource package 608a, and a second resource package 610a from the bundle package 602a. The digital signature component 614 may digitally sign the first app package 604a with a first app package signature 620 utilizing the digital signing certificate 616 to create a signed extracted first app package. The digital signature component 614 may digitally sign the second app packages 606a with a second app package signature 622 utilizing the digital signing certificate 616 to create a signed extracted second app package. The digital signature component 614 may digitally sign the first resource package 608a with a first resource package signature 624 utilizing the digital signing certificate 616 to create a signed extracted first resource package. The digital signature component 614 may digitally sign the second resource package 610a with a second resource package signature 626 utilizing the digital signing certificate 616 to create a signed extracted second resource package. In an example, the packages may be signed sequentially or in parallel.

In an example, the digital signature component 614 may return 628 the signed extracted packages to the bundle package 602a, and may sign the bundle package 602a with a bundle package signature utilizing the digital signing certificate 616 to create a signed bundle package 602b comprising a signed first app package 604b, a signed second app package 606b, a signed first resource package 608b, and a signed second resource package 610b. A set of signature properties (e.g., a digital signing certificate owner, a chain certification of authority, a key usage, a signature validation date, a signature encryption strength, a signature timestamp, etc.) may be shared by the bundle package signature, the first app package signature 620, the second app package signature 622, the first resource package signature 624, and/or the second resource package signature 626. In this way, the signed bundle package 602b and/or the signed packages therein by be selectively and/or individually downloaded and verified in an efficient manner by a client device because the set of signature properties are shared by the package signatures.

Figure 7:
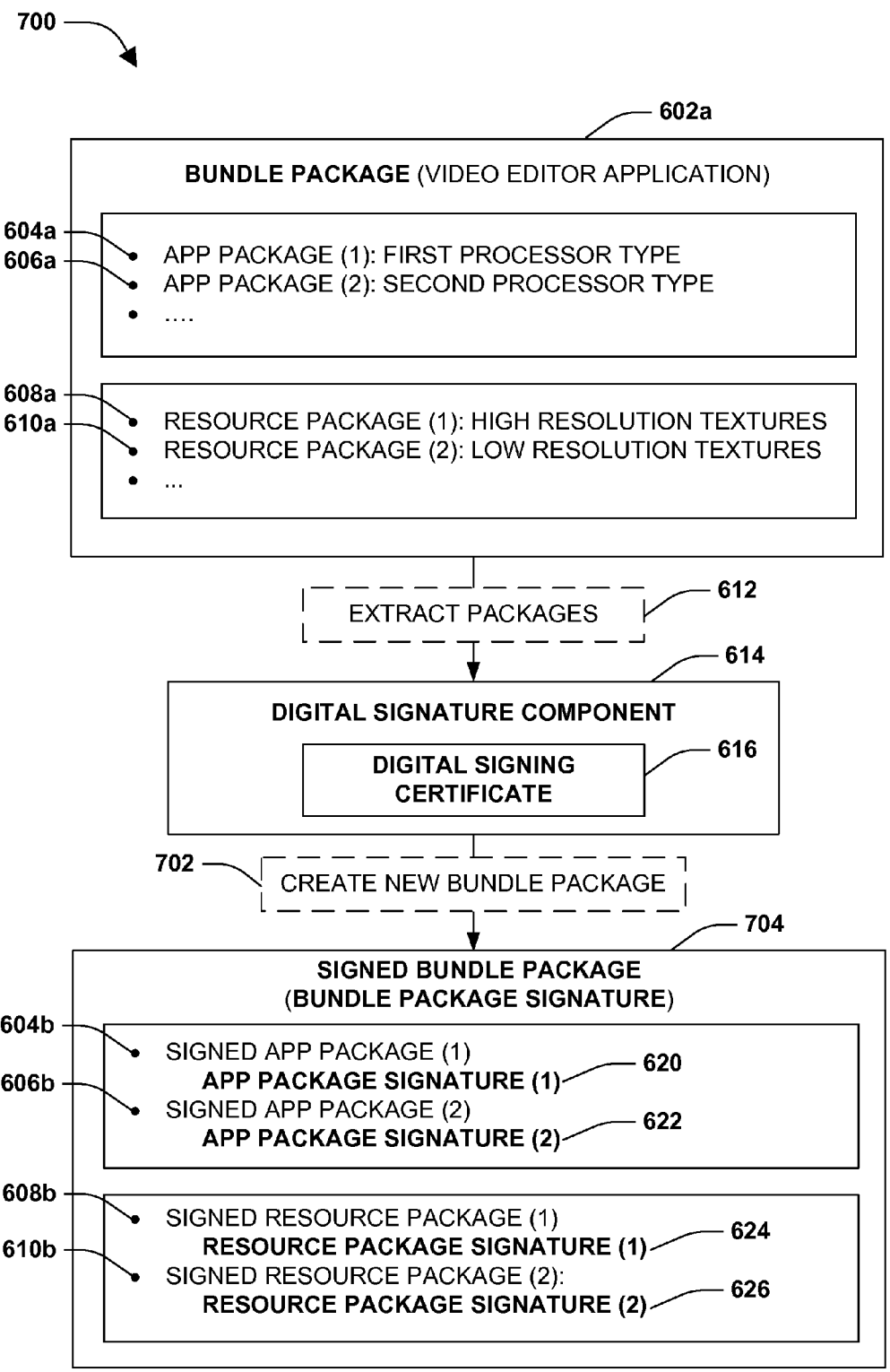
FIG. 7 is a component block diagram illustrating an exemplary system for creating a signed bundle package from a new bundle package.

FIG. 7 illustrates an example of a system 700 for creating a signed bundle package 704 from a new bundle package. The system 700 comprises a digital signature component 614. The digital signature component 614 may be configured to perform a digital signature operation (e.g., a single signing operation) utilizing a digital signing certificate 616 to digitally sign the bundle package (e.g., a bundle package 602a for a video editor application before being digitally signed) and/or packages therein. For example, the digital signature component 614 may extract 612 a first app package 604a, a second app package 606a, a first resource package 608a, and a second resource package 610a from the bundle package 602a. The digital signature component 614 may digitally sign the first app package 604a with a first app package signature 620 utilizing the digital signing certificate 616 to create a signed extracted first app package. The digital signature component 614 may digitally sign the second app packages 606a with a second app package signature 622 utilizing the digital signing certificate 616 to create a signed extracted second app package. The digital signature component 614 may digitally sign the first resource package 608a with a first resource package signature 624 utilizing the digital signing certificate 616 to create a signed extracted first resource package. The digital signature component 614 may digitally sign the second resource package 610*a* with a second resource package signature 626 utilizing the digital signing certificate 616 to create a signed extracted second resource package. In an example, the packages may be signed sequentially or in parallel.

In an example, the digital signature component 614 may create 702 a new bundle package utilizing the signed extracted packages. The new bundle package may be signed with a bundle package signature utilizing the digital signing certificate 616 to create the signed bundle package 704. In this way, the signed bundle package 704 may comprise a signed first app package 604*b* (e.g., corresponding to the first app package 604*a* signed with the first app package signature 620), a signed second app package 606*b* (e.g., corresponding to the second app package 606*a* signed with the second app package signature 622), a signed first resource package 608*b* (e.g., corresponding to the first resource packages 608*a* signed with the first resource package signature 624), and a signed second resource package 610*b* (e.g., corresponding to the second resource package 610*a* signed with the second resource package signature 626). In an example, the signed bundle package 704 may replace the bundle package 602*a* (e.g., the bundle package 602*a* may be deleted). A set of signature properties (e.g., a digital signing certificate owner, a chain certification of authority, a key usage, a signature validation date, a signature encryption strength, a signature timestamp, etc.) may be shared by the bundle package signature, the first app package signature 620, the second app package signature 622, the first resource package signature 624, and/or the second resource package signature 626. In this way, the signed bundle package 704 and/or the signed packages therein by be selectively and/or individually downloaded and verified in an efficient manner by a client device because the set of signature properties are shared by the package signatures.

Figure 8:
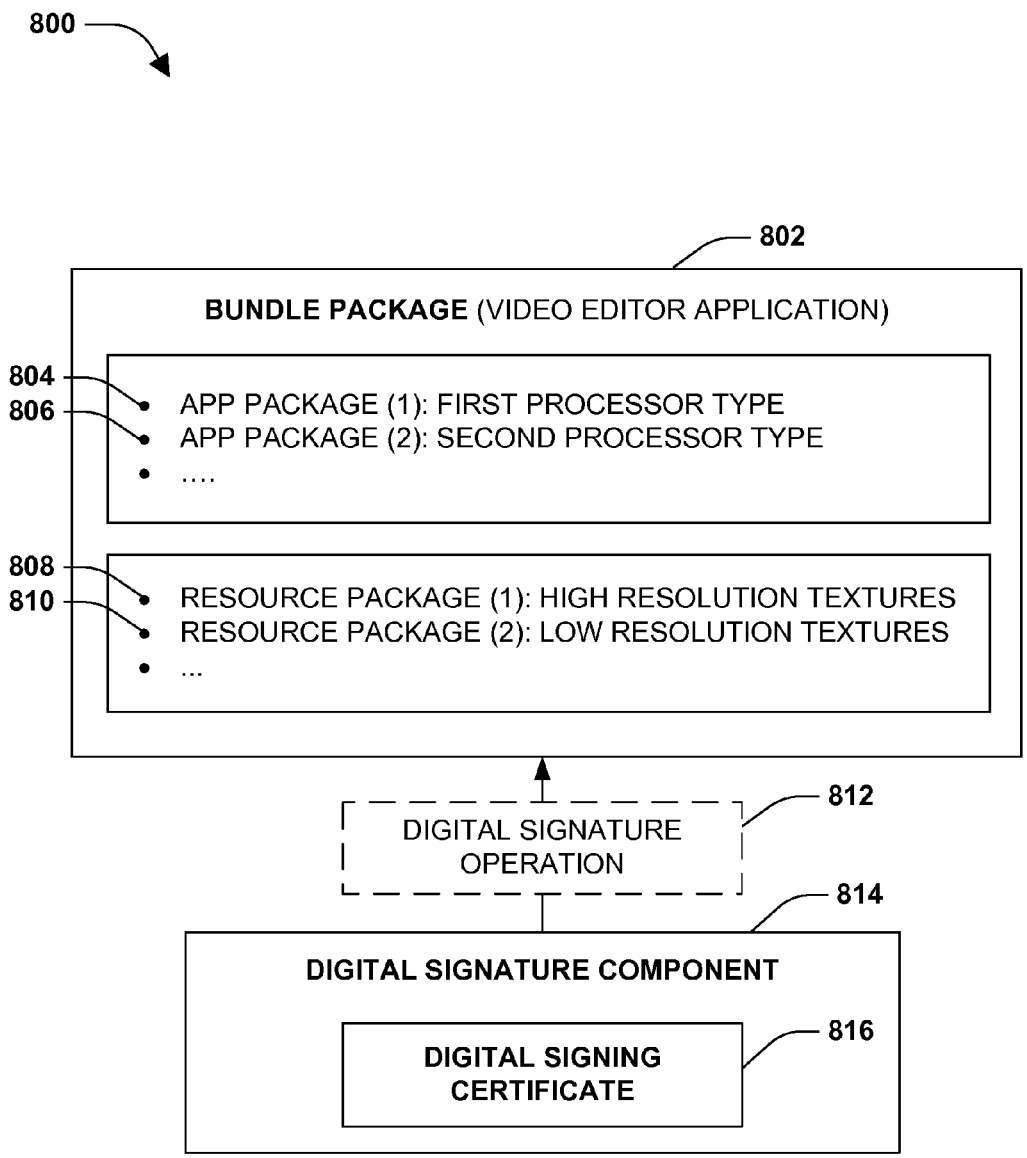
FIG. 8 is a component block diagram illustrating an exemplary system for digitally signing packages within a bundle package in-place.

FIG. 8 illustrates an example of a system 800 for digitally signing packages within a bundle package 802 in-place (e.g., for a video editor application). The system 800 may comprise a digital signature component 814. The digital signature component 814 may be configured to sign a first app package 804 with a first app package signature, a second app package 806 with a second app package signature, a first resource package 808 with a first resource package signature, and a second resource package 810 with a second resource package signature in-place utilizing a digital signing certificate 816 while such packages are comprised within the bundle package 802. The digital signature component 814 may sign the bundle package 802 with a bundle package signature utilizing the digital signing certificate 816 to create a signed bundle package. Because the digital signature component 814 may sign the packages during a digital signature operation 812 using the digital signing certificate 816, a set of signature properties may be shared by the package signatures.

Figure 9:
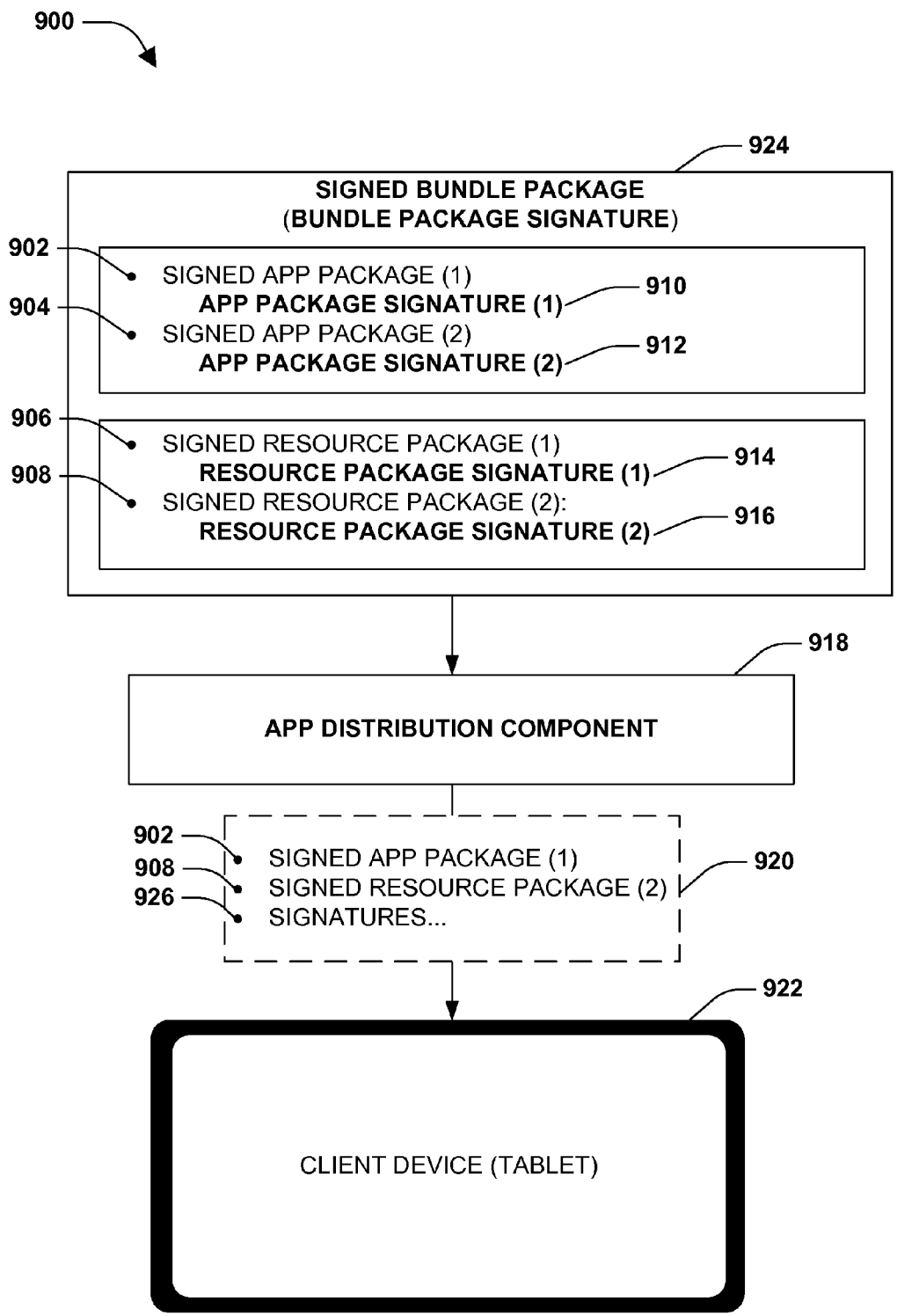
FIG. 9 is a component block diagram illustrating an exemplary system for distributing a signed bundle package and/or signed packages therein.

FIG. 9 illustrates an example of a system 900 for distributing a signed bundle package 924 and/or signed packages therein. The signed bundle package 924 may comprise a signed first app package 902, a signed second app package 904, a signed first resource package 906, and a signed second resource package 908. During a digital signature operation, a digital signing certificate may have be used to sign the signed bundle package 924 with a bundle package signature, the signed first app package 902 with a first app package signature 910, the signed second app package 904 with a second app package signature 912, the signed first resource package 906 with a first resource package signature 914, and the signed second resource package 908 with a second resource package signature 916.

The system 900 may comprise an app distribution component 918. The app distribution component 918 may be configured to expose the signed bundle package 924 and/or the signed packages therein for selective and/or individual download by a client device, such as client device 922. For example, a bundle acquisition request may be received from the client device 922. The bundle acquisition request may specify the signed first app package 902 and the signed second resource package 908. The app distribution component 918 may send 920 the signed first app package 902, the signed second resource package 908, and signatures 926 (e.g., the bundle package signature, the first app package signature 910, and/or the second resource package signature 916) to the client device 922 for verification and/or installation of an application represented by the signed bundle package 924.

Figure 10:
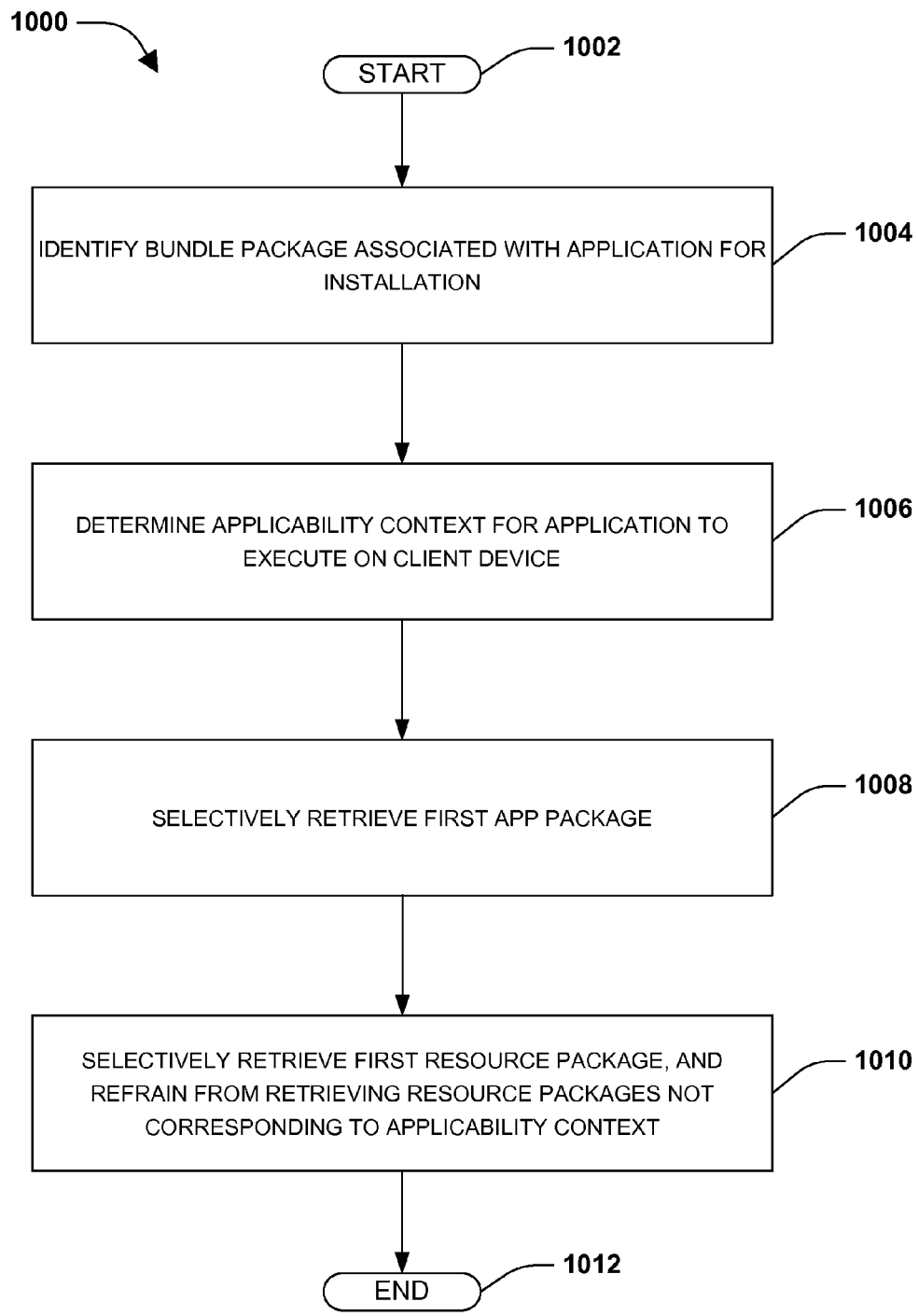
FIG. 10 is a flow diagram illustrating an exemplary method of selectively retrieving portions of a bundle package associated with an application.

An embodiment of selectively retrieving portions of a bundle package associated with an application is illustrated by an exemplary method 1000 of FIG. 10. At 1002, the method starts. At 1004, a bundle package associated with an application may be identified for installation (e.g., an app marketplace may expose the bundle package and/or portions therein for selective and/or individual download). The bundle package may comprise one or more app packages comprising application code configured to execute on various computing environments such as operating systems or computer architectures (e.g., a first app package may comprise an executable binary file for a drawing application that may execute on a mobile operating system) and/or one or more resource packages comprising supplemental data used to provide optional user experience functionality. Because client devices may comprise various computing environments, the one or more app packages may be exposed for selective download (e.g., a gaming computing device may download a second app package comprising a gaming-based operating system, as opposed to the first app package). Because the one more or resource packages may comprise supplemental data used to provide optional user experience functionality that may or may not be relevant to a client device or user, the one or more resource packages may be exposed for selective and/or optional download (e.g., the gaming computing device may download a high resolution texture resource package, but may refrain from downloading a low resolution texture resource package). In an example, the bundle package, the one or more app packages, and/or the one or more resource packages may have been digitally signed with a digital signing certificate (e.g., during a single digital signing operation) such that the packages may share a set of signature properties (e.g., a digital signing certificate owner, a chain certification of authority, a key usage, a signature validation date, a signature encryption strength, a signature timestamp, etc.), which may allow a client device to efficiently verify the packages regardless of whether the packages were selectively and/or individually downloaded.

At 1006, an applicability context for the application to execute on a client device may be determined. The applicability context may correspond to a variety of implicit and/or explicit information associated with the client device and/or a user of the client device. In an example, the applicability context may correspond to a resolution of the client device, a screen scale of the client device, a user experience context for the client device (e.g., the user may specify a high contrast display mode, the user may install a gamepad peripheral device, the user may install a microphone device driver, a location of the user, and/or a variety of other preferences and/or contextual aspects associated with the user), a feature set of a multimedia API available on the client device (e.g., a DirectX® feature set), a graphics processing unit of the client device, a visual quality context for the client device, a language used by the user of the client device, and/or a plethora of other information that may be used to identify user experience functionality that may be relevant to the user and/or the client device. In another example, the client device may be evaluated to implicitly identify the applicability context (e.g., the user may be currently located in France, and thus a French language context may be implied). In another example, a user specified setting for the client device may be determined as the applicability context (e.g., a high contrast display mode set by the user). In another example, a fuzzy matching logic may be applied to information associated with the client device to generate an assumption about the client device or the user as the applicability context (e.g., a gaming graphics card and a gaming peripheral device installed by the user may be used to determine that high resolution textures are desired by the user). In another example where multiple users may utilize the client device, a plurality of users may be enumerated, and the applicability context may be determined based upon the plurality of users (e.g., a German language for a first user and a French language for a second user).

At 1008, a first app package may be selectively retrieved based upon the first app package comprising application code corresponding to a computing environment context (e.g., an operating system, computer architecture, etc.) specified by the applicability context. In an example, a first app package signature of the first app package may be verified (e.g., identification of an app developer of the app package and/or verification that the first app package has not been modified). Responsive to the applicability context corresponding to a first resource package of the one or more resource packages comprised within the bundle package, the first source package is selectively retrieved from the bundle package, at 1010. In an example, a first resource package signature of the first resource package may be verified (e.g., identification of a developer of the first resource package and/or verification that the first resource package has not been modified). Because the bundle package may comprise resource packages that do not correspond to the applicability context, such resource packages are not retrieved from the bundle package. For example, an applicability context for a smart phone may specify a relatively low resolution for the smart phone, and thus a low resolution image resource package, but not a high resolution image resource package, may be retrieved for the smart phone.

In an example, the applicability context may specify an Australian English language. Responsive to the bundle package not comprising a language resource package for the Australian English language, a second language resource package for a second language that corresponds to the Australian English language above a language similarity threshold may be identified (e.g., a British English language resource package may be identified as being more similar to the Australian English language than a United States English language resource package). The second language resource package, such as the British English language resource package, may be selectively retrieved. In this way, resource packages that relate to the applicability context above a similarity threshold (e.g., a "next best" choice) may be selectively retrieved (e.g., a visual resource package that corresponds to a visual quality context of the applicability context above a threshold). The client device may utilize the first app package, the first resource package, and/or other packages retrieved from the bundle package in order to install the application.

In an example, an update to the bundle package may be identified. The update may correspond to an addition of a new resource package to the set of resource packages within the bundle package. Responsive to the applicability context corresponding to the new resource package (e.g., an Australian English language resource package), the new resource package may be selectively retrieved from the bundle package. In this way, the client device may merely obtain app packages and/or resource packages relevant to the client device and/or the user. At 1012, the method ends.

Figure 11:
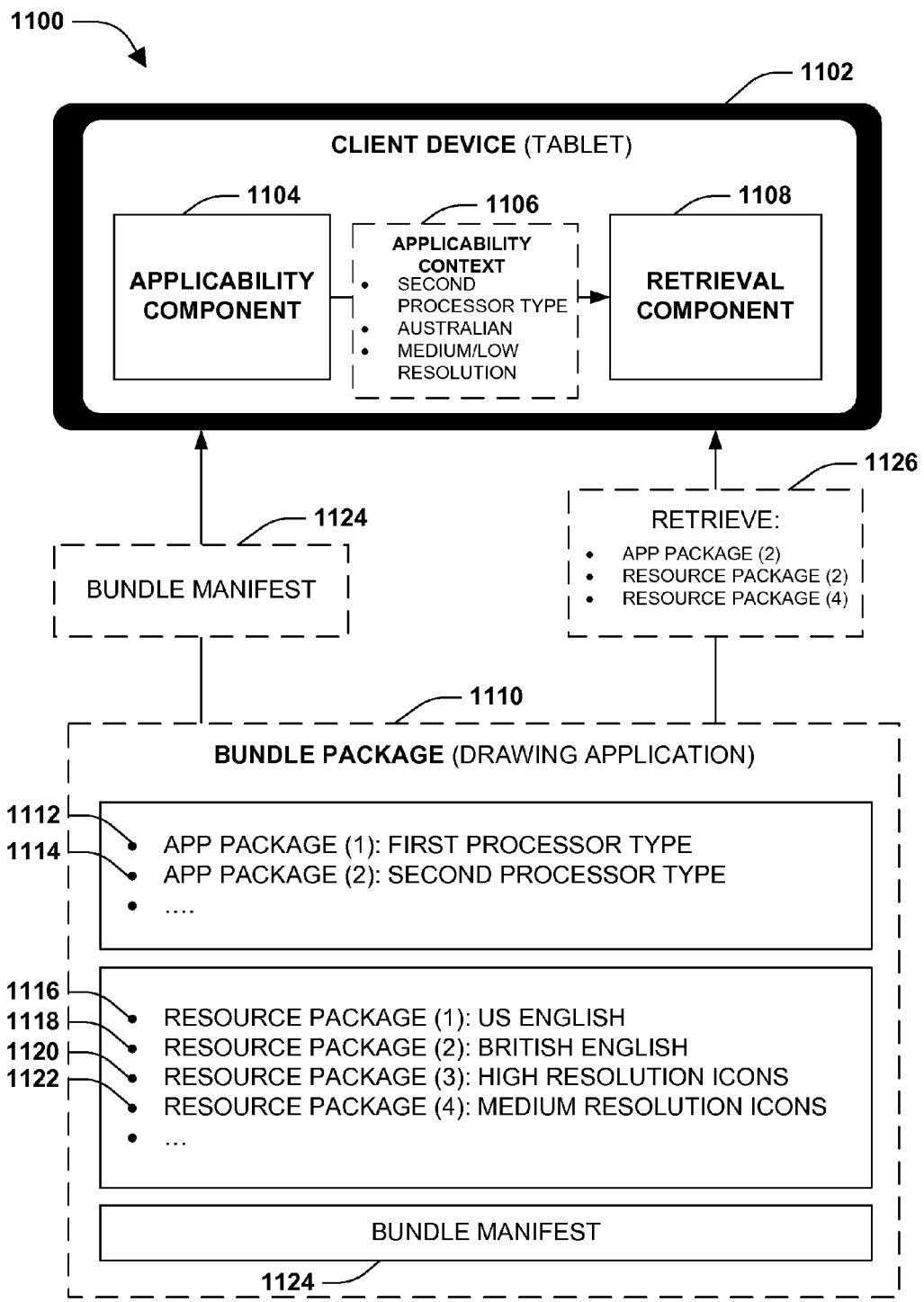
FIG. 11 is a component block diagram illustrating an exemplary system for selectively retrieving portions of a bundle package associated with an application.

FIG. 11 illustrates an example of a system 1100 for selectively retrieving portions of a bundle package 1110 associated with an application. In an example, the bundle package 1110 is associated with a drawing application. The bundle package 1110 comprises one or more app packages and/or one or more resource packages. For example, the bundle package 1110 comprises a first app package 1112 for a first processor type and a second app package 1114 for a second processor type. The bundle package comprises a first resource package for a United States English language, a second resource package 1118 for a British English language, a third resource package 1120 for high resolution icons, and a fourth resource package 1122 for medium resolution icons. The one or more resource packages may be exposed for selective and/or optional download for the drawing application. That is, a resource package may comprise supplemental data used to provide optional user experience functionality for the application.

In an example, a client device 1102, such as a tablet device, may identify the bundle package 1110 for the drawing application. The client device 1102 may obtain a bundle manifest 1124 describing the one or more app packages and/or the one or more resource packages within the bundle package 1110. The system 1100 may comprise an applicability component 1104 configured to determine an applicability context 1106 for the client device 1102. For example, the applicability context 1106 may specify that the client device 1102 has a second processor type, a user of the client device 1102 speaks Australian English, and that the client device 1102 supports medium to low resolution graphics. The system 1100 may comprise a retrieval component 1108 configured to retrieve 1126 an app package and/or one or more resource packages corresponding to the applicability context 1106. The retrieval component 1108 may refrain from retrieving app packages and/or resource packages that do not correspond to the applicability context 1106 (e.g., that do not correspond above a similarity threshold). In an example, the retrieval component 1108 may retrieve 1126 the second app package 1114, the second resource package 1118 (e.g., because the British English language may correspond to the Australian English language context above a similarity threshold, whereas the United States English language does not), and the fourth resource package 1122 (e.g., because medium resolution icons may correspond to the medium to low resolution context above a similarity threshold, whereas the high resolution icons do not) because such packages correspond to the applicability context 1106. In this way, the client device 1102 may install the drawing application using the selectively downloaded packages.

Figure 12:
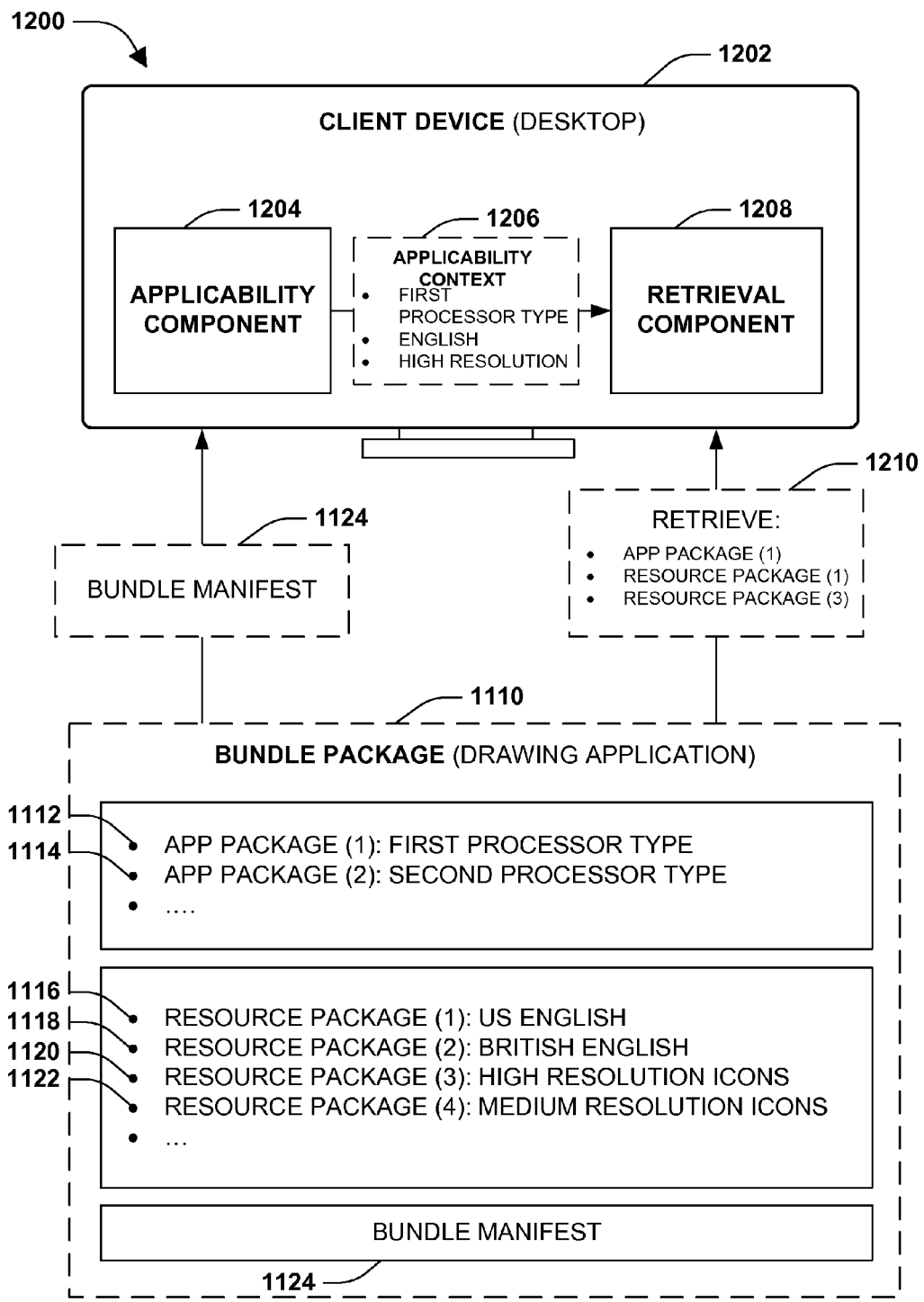
FIG. 12 is a component block diagram illustrating an exemplary system for selectively retrieving portions of a bundle package associated with an application.

FIG. 12 illustrates an example of a system 1200 for selectively retrieving portions of a bundle package 1110 associated with an application. In an example, the bundle package 1110 is associated with a drawing application. The bundle package 1110 comprises one or more app packages and/or one or more resource packages. For example, the bundle package 1100 comprises a first app package 1112 for a first processor type and a second app package 1114 for a second processor type. The bundle package 1110 comprises a first resource package 1116 for a United States English language, a second resource package 1118 for a British English language, a third resource package 1120 for high resolution icons, and a fourth resource package 1122 for medium resolution icons. The one or more resource packages may be exposed for selective and/or optional download for the drawing application. That is, a resource package may comprise supplemental data used to provide optional user experience functionality for the application.

In an example, a client device 1202, such as a gaming desktop, may identify the bundle package 1110 for the drawing application. The client device 1202 may obtain a bundle manifest 1124 describing the one or more app packages and/or the one or more resource packages within the bundle package 1110. The system 1200 may comprise an applicability component 1204 configured to determine an applicability context 1206 for the client device 1202. For example, the applicability context 1206 may specify that the client device 1202 has a first processor type, a user of the client device 1102 speaks English, and that the client device 1202 supports high resolution graphics. The system 1200 may comprise a retrieval component 1208 configured to retrieve 1210 an app package and/or one or more resource packages corresponding to the applicability context 1206. The retrieval component 1208 may refrain from retrieving app packages and/or resource packages that do not correspond to the applicability context 1206. In an example, the retrieval component 1208 may retrieve 1210 the first app package 1112, the first resource package 1116, and the third resource package 1120 because such packages correspond to the applicability content 1206. In this way, the client device 1202 may install the drawing application using the selectively downloaded packages.

Figure 13:
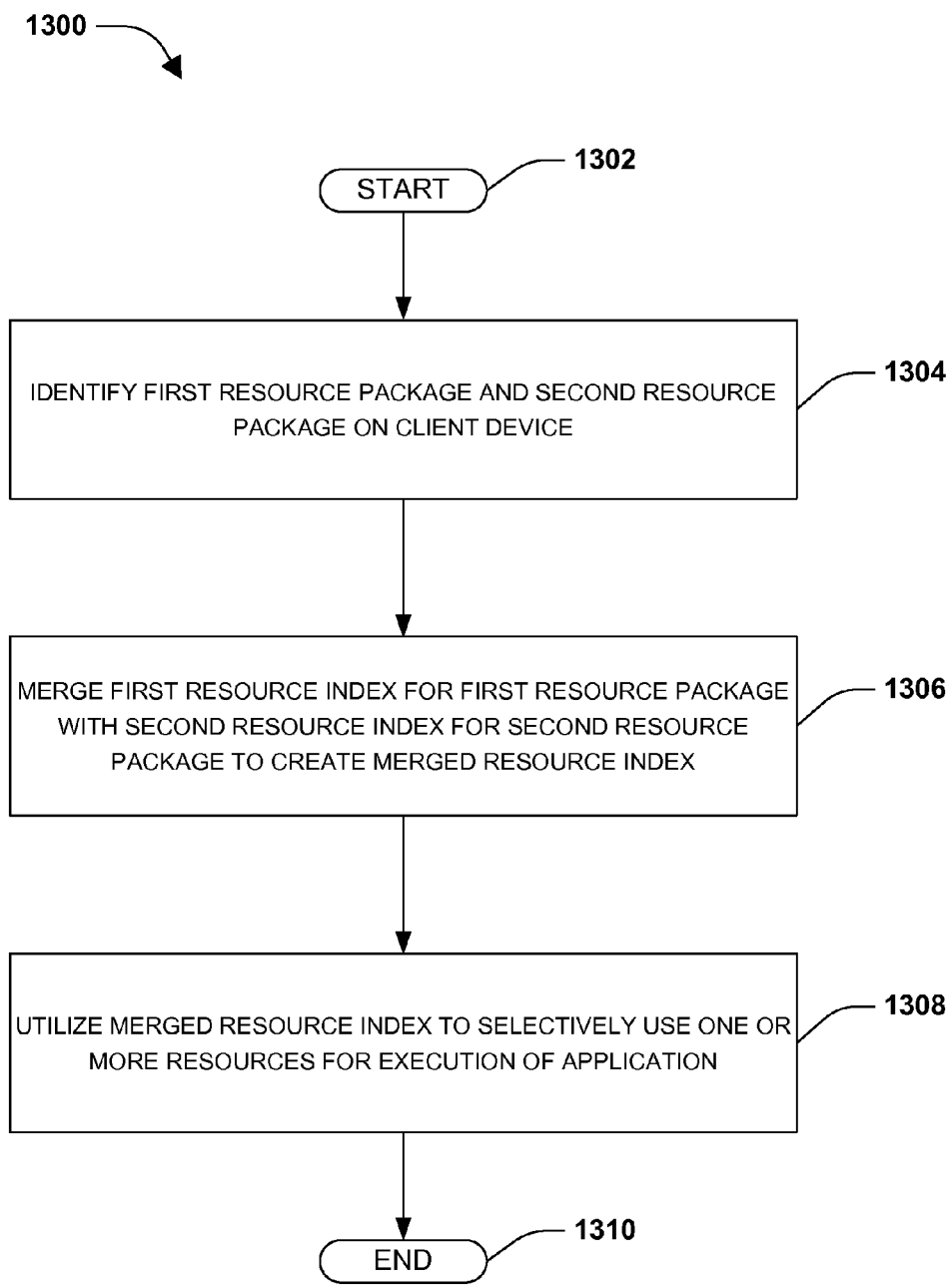
FIG. 13 is a flow diagram illustrating an exemplary method of indexing resource packages for an application on a client device.

An embodiment of indexing resources within packages, such as resources packages and/or app packages, for an application on a client device is illustrated by an exemplary method 1300 of FIG. 13. At 1302, the method starts. In an example, a client device may have selectively retrieved an app package and one or more resource packages associated with an application. In an example, a first app package signature of the app package may be verified (e.g., identification of an app developer of the app package and/or verification that the app package has not been modified) and/or resource signatures of the one or more resource packages may be verified (e.g., identification of a developer of a resource package and/or verification that a resource package has not been modified). Because the one or more resource packages may have been individually downloaded and/or stored on the client device, it may be advantageous to track such resource packages for utilization by the application during runtime. Accordingly, a first resource package and a second resource package, for example, may be identified on the client device, at 1304. The first resource package may comprise first supplemental data used to provide first optional user experience functionality for the application (e.g., one or more high resolution icons within a high resolution icon resource package). The second resource package may comprise second supplemental data used to provide second optional user experience functionality for the application (e.g., one or more multimedia feature resources within a feature set for a multimedia API version 11). The first resource package may comprise a first resource index describing first resource data (e.g., identification that the first resource package comprises the one or more high resolution icons) and/or first resource applicability data (e.g., identification that the high resolution icon data applies to the application when executed on a client device capable of displaying high resolution icon data). The second resource package may comprise a second resource index describing second resource data (e.g., a description of the one or more multimedia feature resources) and/or first resource applicability data (e.g., identification that the feature set can be used when a client device has the multimedia API version 11 installed).

In an example, a resource package may comprise a subset of resources for an application (e.g., a Canadian English resource package may comprise a few Canadian text strings such as Colour and Favourite, while a neutral or United States English resource package comprises a plurality of text strings for other words). In an example, a single resource package may comprise several variants of an individual resource (e.g., a high contrast version of a German image, a low contrast version of the German image, etc.).

At 1306, the first resource index for the first resource package may be merged with the second resource index for the second resource package to create a merged resource index. It will be appreciated that a merged resource index is generally, but not always or exclusively, client side, whereas a bundle manifest is generally, but not always or exclusively, server or developer side. Additionally, a merged resource index is generally, but not always, used to determine which individual resources within available (e.g., local) resource packages may be used during execution of the application, whereas a bundle manifest is generally, but not always, used to determine which app package(s) and/or which resource package(s) to download to a client device. In an example, a plurality of resource indexes for resource packages associated with the application may be merged into the merged resource index such that the merged resource index may describe individual resources within the resource packages that may be loaded when executing the application (e.g., a multi-dimensional lookup may be performed within the merged resource index to identify a set of resources, such as text strings, images, icons, etc., for execution of the application). For example, a third resource package may be retrieved from an app marketplace. The third resource package may comprise third supplemental data used to provide third optional user experience functionality for the application (e.g., one or more German strings within a German language resource package). In an example, during deployment of the third resource package to the client device, a third resource index for the third resource package may be merged into the merged resource index. In another example, the third resource index may be merged into the merged resource index during an initial execution of the application. In an example, the merged resource index may comprise one or more references to resources within the resource packages. In another example, a reference to the merged resource index may be created within an app package for the application. The app package may comprise application code for execution of the application, such that the reference may be used to access the merged resource index during execution of the application so that individual resources from one or more resource packages may be selectively used.

In an example, an app package associated with the application may be identified. The app package may comprise application code configured for execution of the application. A resource index for the app package (e.g., describing one or more resources provided by the app package) may be merged into the merged index.

At 1308, the merged resource index may be utilized to selectively use resources from one or more packages, such as resource packages and/or app packages, for execution of the application (e.g., a high resolution welcome screen image resource, a German welcome text string, etc.). In an example, responsive to executing the application in a runtime state utilizing the app package, the merged resource index may be evaluated to identify a set of resources used to provide optional user experience functionality for the application. In this way, the application may be invoked to utilize the set of resource packages and/or one or more resources therein (e.g., and/or within the app package). In an example of utilizing the merged resource index, a multidimensional lookup may be performed within the merged resource index to identify an appropriate set of resources, which may be comprised within one or more resource packages. For example, the merged resource index may comprise a language dimension, a resolution dimension, a screen scale dimension, a visual quality dimension, a multimedia API dimension, a supplemental functionality dimension, and/or a variety of other dimensions that may be evaluated to identify resources that may be relevant to execution of the application on the client device (e.g., a French text string resource and a German text string resource may be available, and the French text string resource may be selected over the German text string resource because a current user of the client device prefers French and/or the client device is currently located in France). In an example, the set of resources may span across all or fewer than all available resource packages for the application (e.g., the set of resources may be comprised within a subset of resource packages identified through the merged resource index based upon the set of resources being relevant to the client device and/or the user, such as resources corresponding to a display quality user experience of the client device and/or a language of the user above a threshold correspondence). At 1310, the method ends.

In some embodiments of indexing resources for an application on a client device, a resource package and an app package may be identified on the client device. The resource package may comprise supplemental data used to provide optional user experience functionality for the application. The app package may comprise application code (e.g., an application binary) configured for execution of the application. A first resource index for the resource package (e.g., describing individual resources within the resource package) may be merged with a second resource package for the app package (e.g., describing individual resources within the app package) to create a merged resource index. The merged resource index may be utilized to selectively utilize one or more resources within the resource package and/or the app package for execution of the application.

Figure 14:
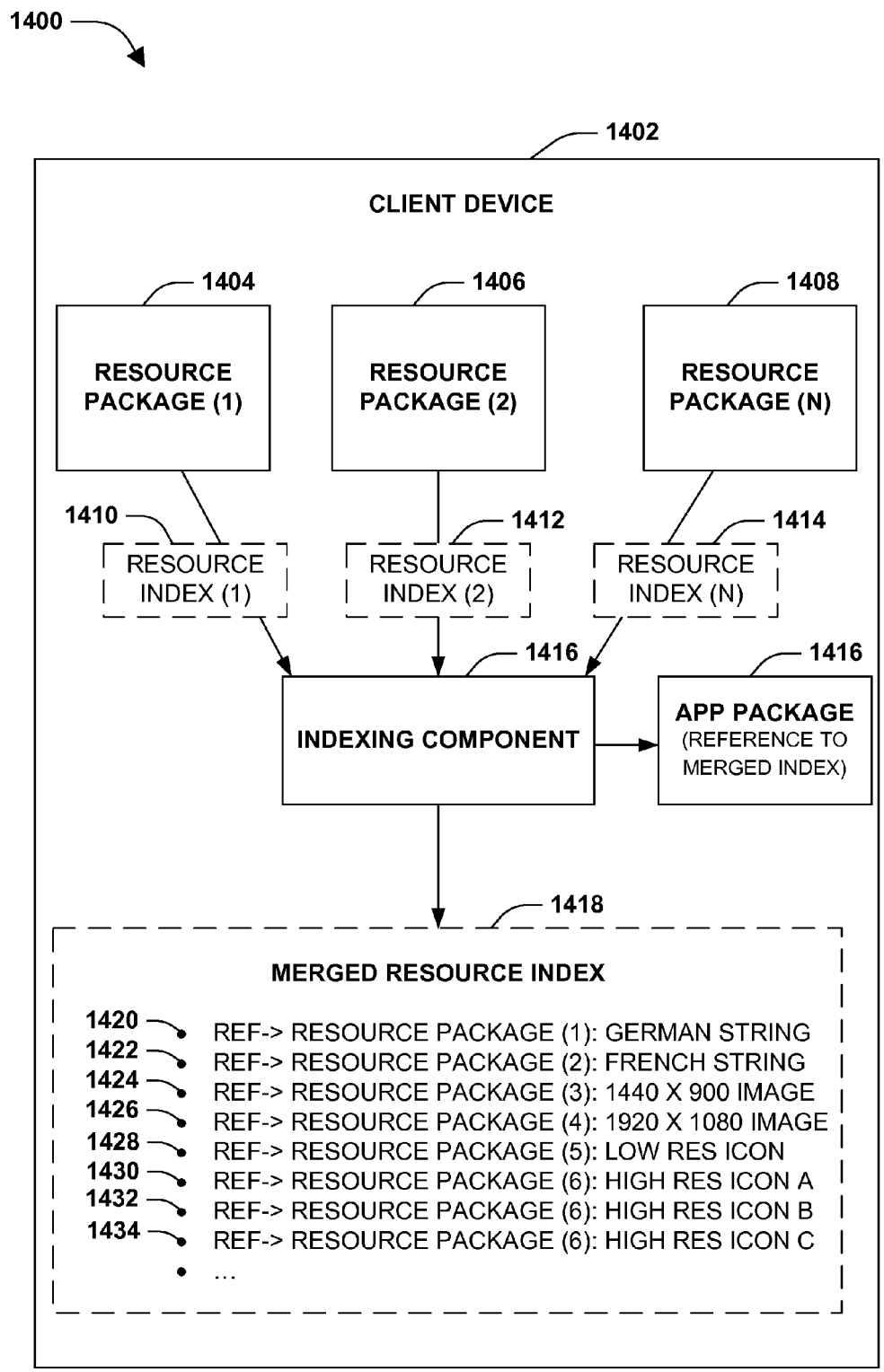
FIG. 14 is a component block diagram illustrating an exemplary system for indexing resource packages for an application on a client device.

FIG. 14 illustrates an example of a system 1400 for indexing resources within packages, such as resource packages and/or app packages, for an application on a client device 1402. The client device 1402 may comprise a first resource package 1404 for a German language (e.g., one or more German string resources), a second resource package 1406 for a French language (e.g., one or more French string resources), and/or other resource packages, such as a resource package (N) 1408. The system 1400 may comprise an indexing component 1416. The indexing component 1416 may be configured to identify such resource packages on the client device 1402. The indexing component 1416 may be configured to merge resource indexes describing individual resources within the resource packages into a merged resource index 1418. For example, a first resource index 1410, a second resource index 1412, and/or other resource indexes, such as resource index (N) 1414, may be merged into the merged resource index 1418. In this way, the merged resource index 1418 may describe individual resources within the resource packages that may be available for utilization by the application. For example, the merged resource index may comprise a first reference 1420 to a German string resource within the first resource package 1404, a second reference 1422 to a French string resource within the second resource package, and/or other references to other resources within resource packages (e.g., a reference 1424 to a medium resolution image resource within a third resource package, a reference 1426 to a high resolution image resource within a fourth resource package, a reference 1428 to a low resolution icon resource within a fifth resource package, a reference 1430 to a high resolution icon A within a sixth resource package; a reference 1432 to a high resolution icon B within the sixth resource package; and/or a reference 1434 to a high resolution icon C within the sixth resource package). In an example, the indexing component 1416 may create a reference within an app package 1416 for the application. In this way, during execution of the application utilizing the app package 1416, the reference may be used to access the merged resource index 1418 in order to identify (e.g., utilizing a multi-dimensional lookup where dimensions correspond to various user experience functionality such as language or display quality) one or more resources for use by the application.

Figure 15:
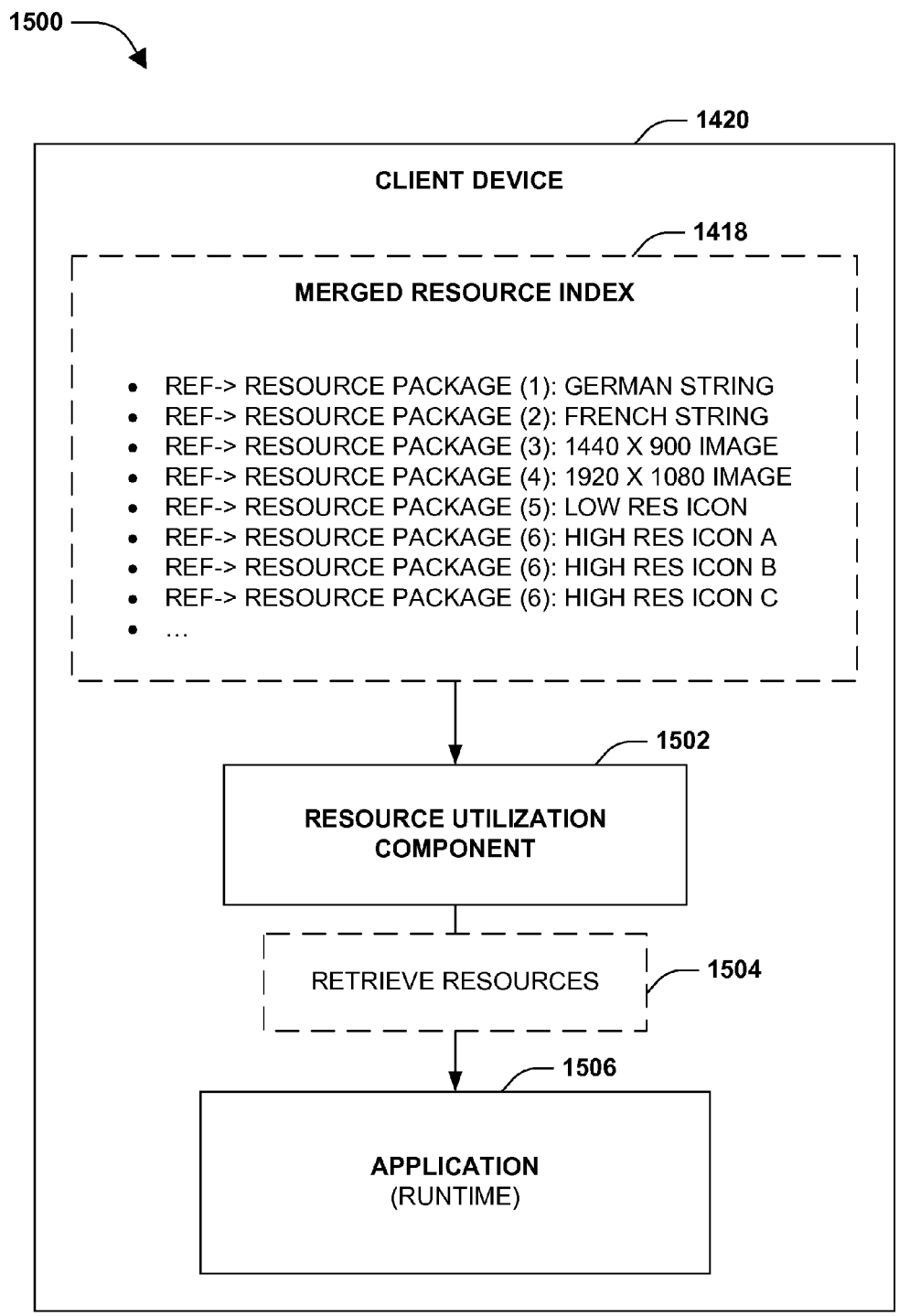
FIG. 15 is a component block diagram illustrating an exemplary system for utilizing a merged index during execution of an application.

FIG. 15 illustrates an example of a system 1500 for utilizing a merged index 1418 during execution of an application 1506. The system 1500 may comprise a resource utilization component 1502. The resource utilization component 1502 may be configured to detect the application 1506 being executed in a runtime state utilizing an app package. Responsive to the application 1506 being executed, the resource utilization component 1502 may evaluate a merged resource index 1418 (e.g., merged resource index 1418 of FIG. 14) to identify a set of resources that may be used to provide optional user experience functionality for the application. For example, a multidimensional lookup corresponding to a language dimension, a resolution dimension, an icon resolution dimension, and/or other dimension may be performed within the merged resource index 1418. For example, the set of resources may comprise a German string resource within a first resource package for a German language (e.g., based upon a language spoken by a current user), a high resolution image resource within a fourth resource package for high resolution (e.g., based upon a screen type of the client device 1420), and a high resolution icon resource within a sixth resource package for high resolution icons (e.g., based upon a graphics card of the client device 1420). In this way, the German string resource, the high resolution image resource, and the high resolution icon resource may be retrieved 1504 (e.g., on demand) for utilization by the application 1506.

Figure 16:
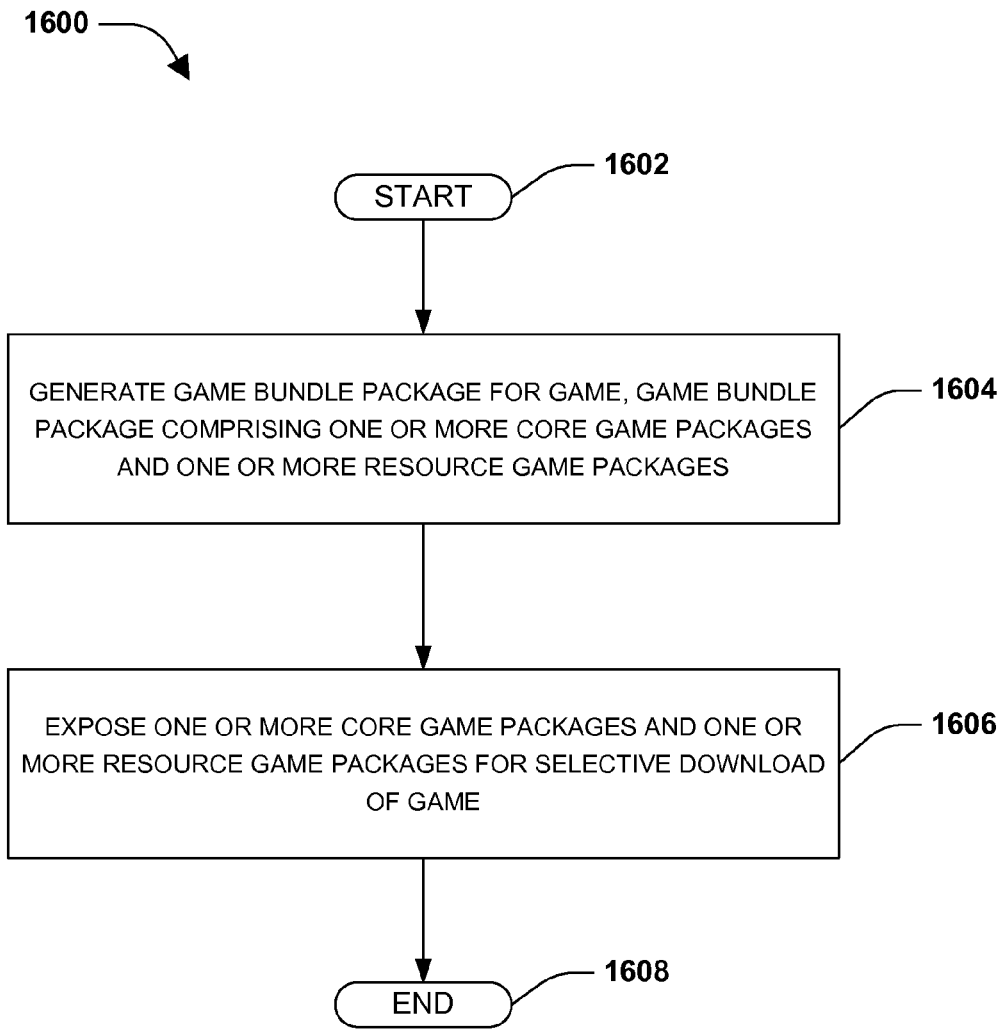
FIG. 16 is a flow diagram illustrating an exemplary method of distributing a game via a game bundle package.

An embodiment of distributing a game via a game bundle package is illustrated by an exemplary method 1600 of FIG. 16. At 1602, the method starts. At 1604, a game bundle package for a game may be generated. The game bundle package may comprise one or more core game packages (e.g., executable binary files that may be executed to play a core experience of the game). In an example, the game bundle package may comprise a first core game package comprising game code configured to execute on a first computing environment (e.g., a first processor type, a particular operating system, etc.). In another example, the game bundle package may comprise a second core game package comprising game code configured to execute on a second computing environment (e.g., a second processor type, a mobile operating system, etc.).

The game bundle package may comprise one or more resource game packages that provide optional user experience functionality for the game. In an example, the game bundle package may comprise a first resource game package comprising first supplemental hardware-aware data used to provide first optional user experience functionality for the game. For example, the first supplemental hardware-aware data may correspond to a first display quality user experience (e.g., the first supplemental hardware-aware data may comprise texture imagery, terrain data, character geometry, and/or game visualization data at a relatively high display quality that may be supported by graphically capable hardware such as a gaming graphics processing unit or a gaming feature set of a multimedia API such as DirectX®). In another example, the game bundle package may comprise a second resource game package comprising second supplemental hardware-aware data used to provide second optional user experience functionality for the game. For example, the second supplemental hardware-aware data may correspond to a second display quality user experience (e.g., the second supplemental hardware-aware data may comprise texture imagery, terrain data, character geometry, and/or game visualization data at a relatively low display quality that may be supported by mobile device hardware such as a tablet graphics processing unit or a mobile feature set of a multimedia API such as DirectX®). In an example, the game bundle package, the one or more core game packages, and/or the one or more resource game packages may be digitally signed with a digital signing certificate (e.g., during a single digital signing operation) such that the packages may share a set of signature properties (e.g., a digital signing certificate owner, a chain certification of authority, a key usage, a signature validation date, a signature encryption strength, a signature timestamp, etc.), which may allow a client device to efficiently verify the packages regardless of whether the packages were selectively and/or individually downloaded.

In an example, a game bundle update for the game bundle package may be received (e.g., addition, removal, or modification of a resource package). The game bundle update may comprise a new resource game package for inclusion within the game bundle package. The game bundle package may be updated to comprise the new resource game package. In an example where the game bundle package was certified by an app marketplace certification process, merely the new resource game package may be certified, rather than having to re-certify the entire game bundle package.

At 1606, the one or more core game packages and/or one or more resource game packages may be exposed for selective download of the game. In an example, a game bundle acquisition request may be received from a client device. The game bundle acquisition request may specify the first core game package and a subset of resource game packages (e.g., at least some but fewer than all of the one more resource game packages within the game bundle package). In this way, the first core game package and the subset of resource game packages may be selectively provided to the client device for installation of the game. At 1608, the method ends.

Figure 17:
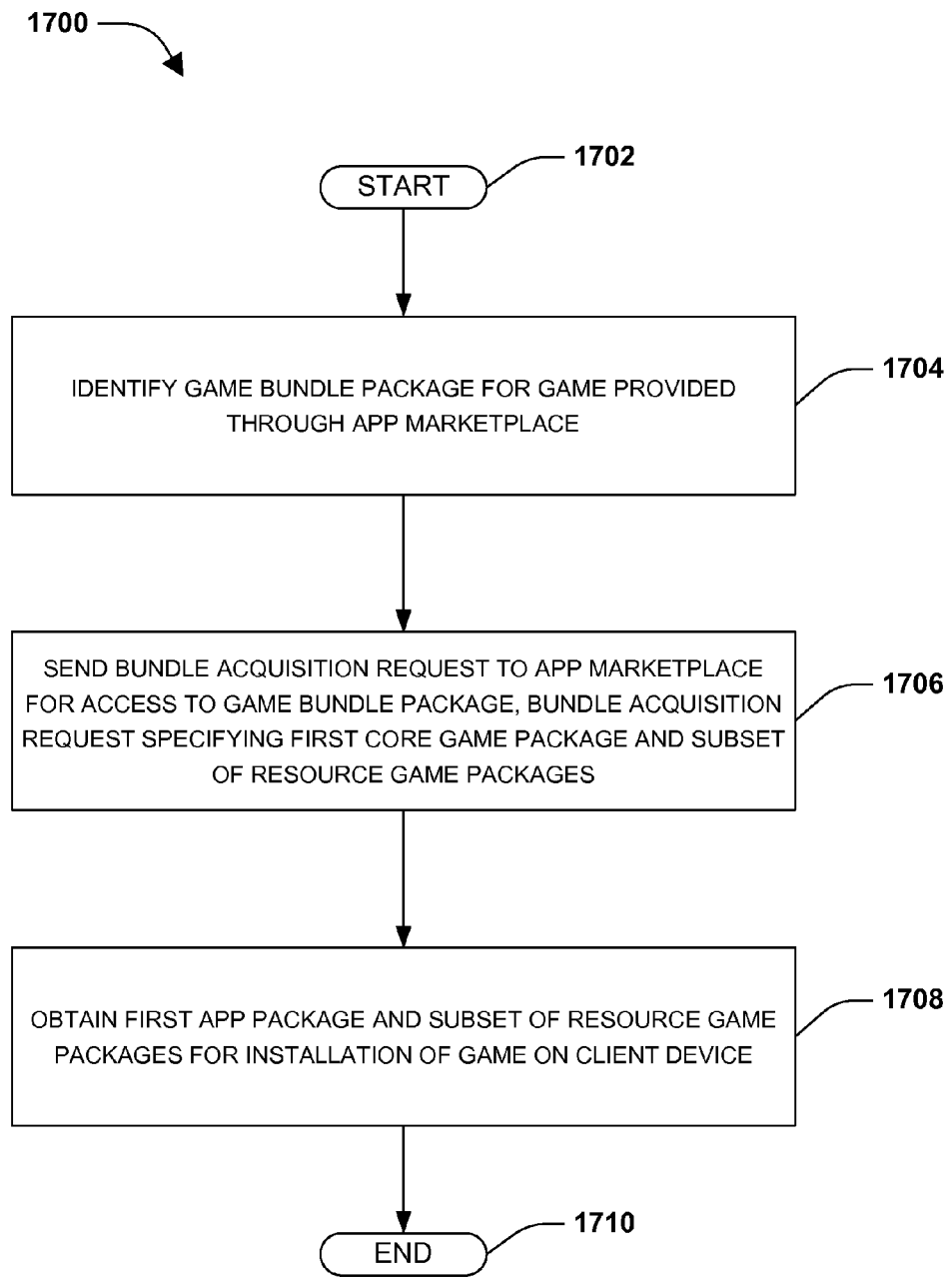
FIG. 17 is a flow diagram illustrating an exemplary method of installing a game via a game bundle package.

An embodiment of installing a game via a game bundle package is illustrated by an exemplary method 1700 of FIG. 17. At 1702, the method starts. At 1704, a game bundle package for a game provided through an app marketplace may be identified. The game bundle package may comprise one or more core game packages and/or one or more resource game packages. The one or more resource game packages may be exposed as optional downloads providing optional user experience functionality for the game (e.g., support for a game pad, support for a multimedia API version, high resolution textures, support for a chat client, support for a gaming headset or other peripheral, etc.). At 1706, a bundle acquisition request may be sent to the app marketplace for access to the game bundle package. The bundle acquisition request may specify a first core game package and a subset of resource game packages (e.g., the subset of resource game packages may comprise at least some but fewer than all of the one or more resource game packages within the game bundle package). In an example, the subset of resource game packages may be identified based upon hardware resources and/or multimedia functionality of the client device, for example. At 1708, the first app package and the subset of resource game packages may be obtained for installation of the game on the client device. At 1710, the method ends.

Figure 18:
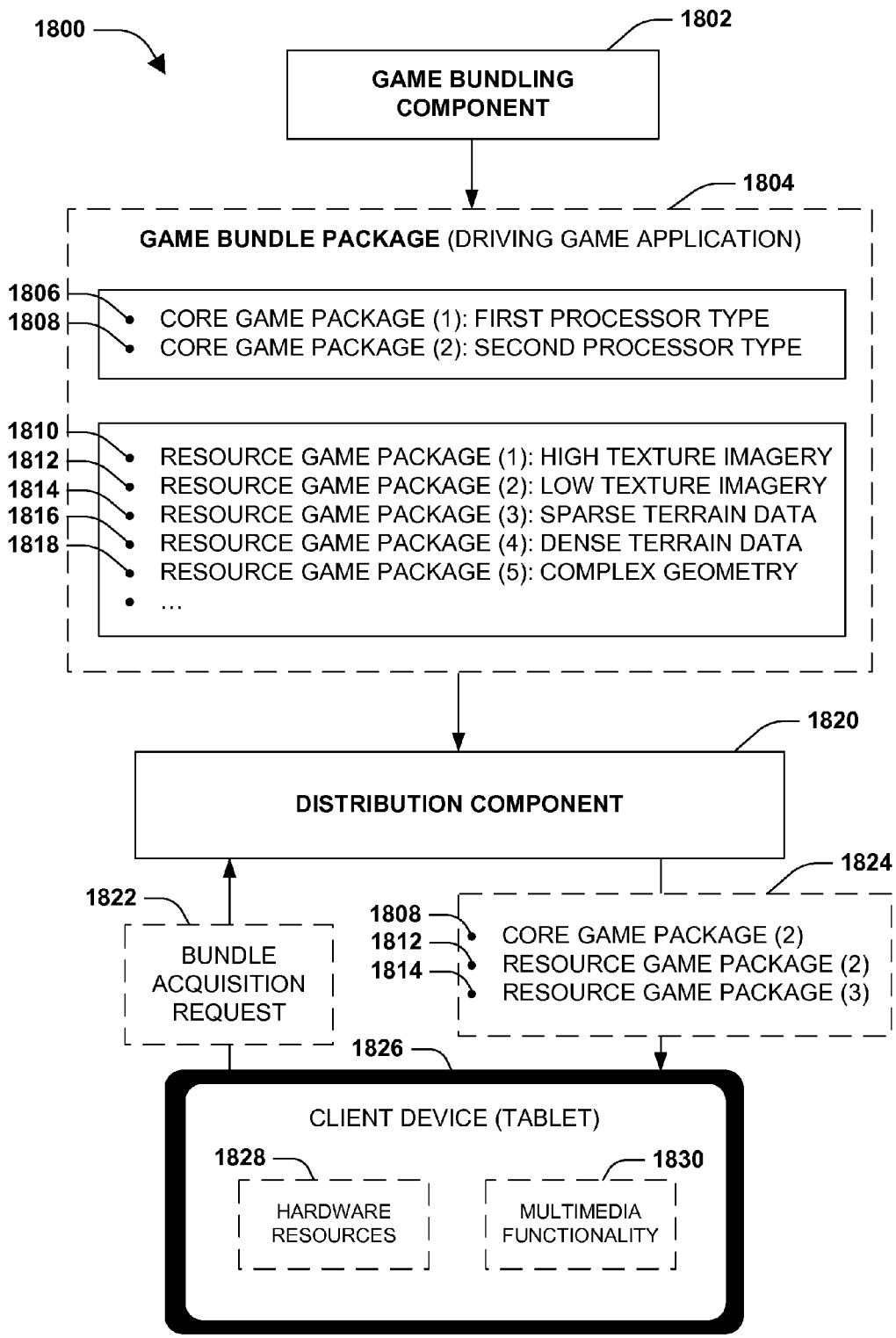
FIG. 18 is a component block diagram illustrating an exemplary system for distributing a game via a game bundle package.

FIG. 18 illustrates an example of a system 1800 for distributing a game via a game bundle package 1804. In an example, the game bundle package 1804 is associated with a driving game application. A game bundling component 1802 may be configured to generate the game bundle package to comprise one or more core game packages and/or one or more resource game packages. The game bundle package 1804 may comprise a first core game package 1806 comprising game code configured to execute on a first processor type and a second core game package 1808 comprising game code configured to execute on a second processor type. The game bundle package 1804 may comprise one or more resource game packages that comprise supplemental hardware-aware data used to provide optional user experience functionality for the game (e.g., a first resource game package 1810 for high texture imagery, a second resource game package 1812 for low resolution texture imagery, a third resource game package 1814 for sparse terrain data, a fourth resource game package 1816 for dense terrain data, a fifth resource game package 1818 for complex geometry, and/or other resource game packages). The game bundle package may be exposed for selective download of the game (e.g., the one or more resource game packages may be exposed as optional downloads for the game).

The system 1800 may comprise a distribution component 1820. The distribution component 1820 may be configured to receive a bundle acquisition request 1822 for the game bundle package 1804 from a client device 1826 such as a tablet device. The bundle acquisition request 1822 may specify the second core game package 1808, the second resource game package 1812, and the third resource game package 1814 based upon hardware resources 1828 (e.g., a gaming peripheral, a graphics card, etc.) and/or multimedia functionality 1830 of the client device 1826 (e.g., a multimedia API version, a display driver, etc.). For example, the client device 1826 may comprise a second processor type, a relatively small amount of storage space, and/or relatively low resolution display functionality and hardware. In this way, the low texture imagery and the sparse terrain data may be requested by the client device 1826 in order to reduce download bandwidth, storage space, and/or computing resources associated with obtaining and deploying the game (e.g., unsupported high resolution visual data is not unnecessarily downloaded). In this way, the distribution component 1820 may provide 1824 the second core game package

1808, the second resource game package 1812, and/or the third resource game package 1814 to the client device 1826 for installation of the game.

Figure 19:
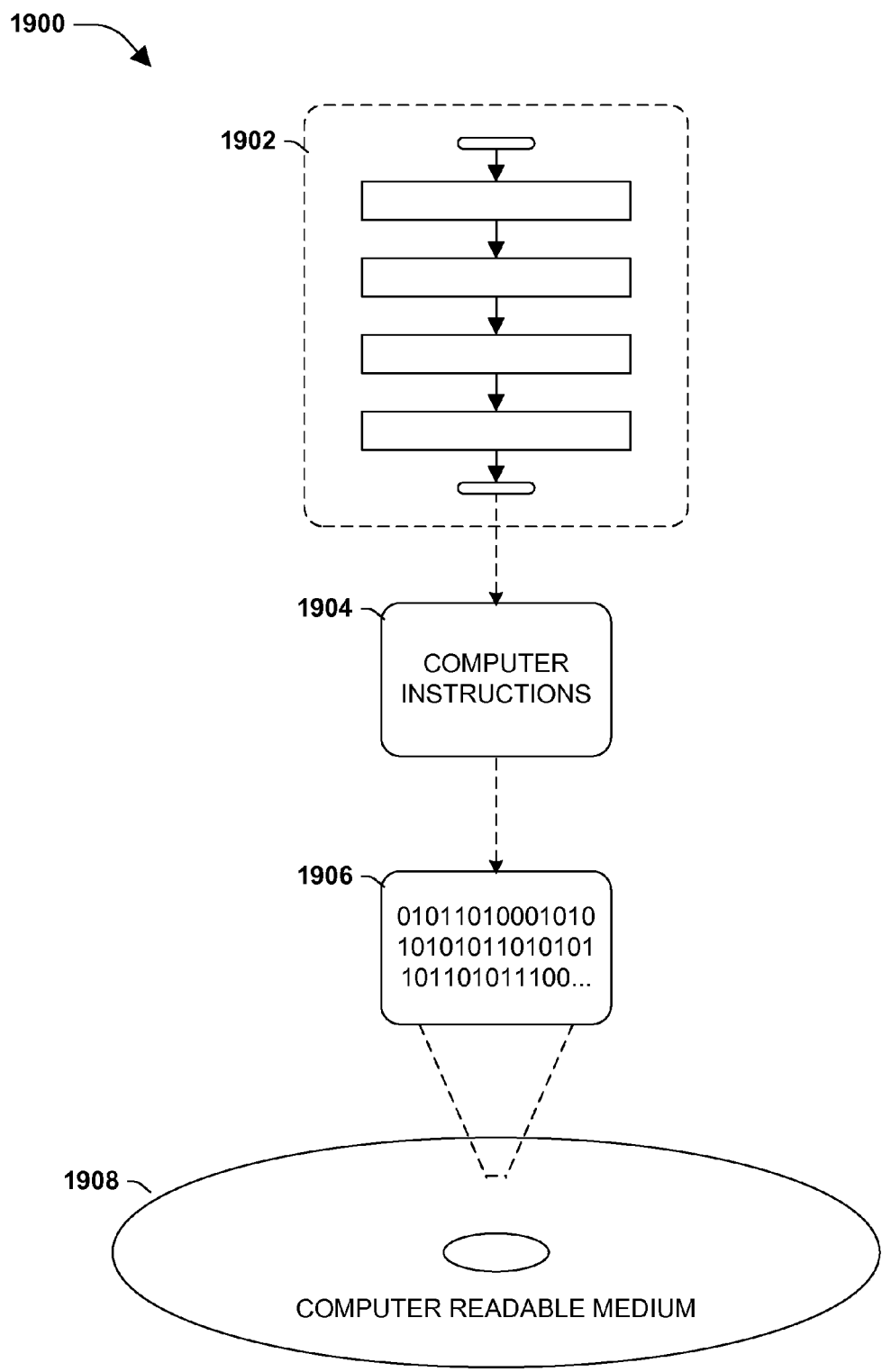
FIG. 19 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 19, wherein the implementation 1900 comprises a computer-readable medium 1908, such as a CD-R, DVD-R, flash drive, a platter of a hard disk drive, etc., on which is encoded computer-readable data 1906. This computer-readable data 1906, such as binary data comprising at least one of a zero or a one, in turn comprises a set of computer instructions 1904 configured to operate according to one or more of the principles set forth herein. In some embodiments, the processor-executable computer instructions 1904 are configured to perform a method 1902, such as at least some of the exemplary method 100 of FIG. 1, at least some of the exemplary method 500 of FIG. 5, at least some of the exemplary method 1000 of FIG. 10, at least some of the exemplary method 1300 of FIG. 13, at least some of the exemplary method 1600 of FIG. 16, and/or at least some of the exemplary method 1700 of FIG. 17, for example. In some embodiments, the processor-executable instructions 1904 are configured to implement a system, such as at least some of the exemplary system 200 of FIG. 2, at least some of the exemplary system 400 of FIG. 4, at least some of the exemplary system 600 of FIG. 6, at least some of the exemplary system 700 of FIG. 7, at least some of the exemplary system 800 of FIG. 8, at least some of the exemplary system 900 of FIG. 9, at least some of the exemplary system 1100 of FIG. 11, at least some of the exemplary system 1200 of FIG. 12, at least some of the exemplary system 1400 of FIG. 14, at least some of the exemplary system 1500 of FIG. 15, and/or at least some of the exemplary system 1800 of FIG. 18, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 20:
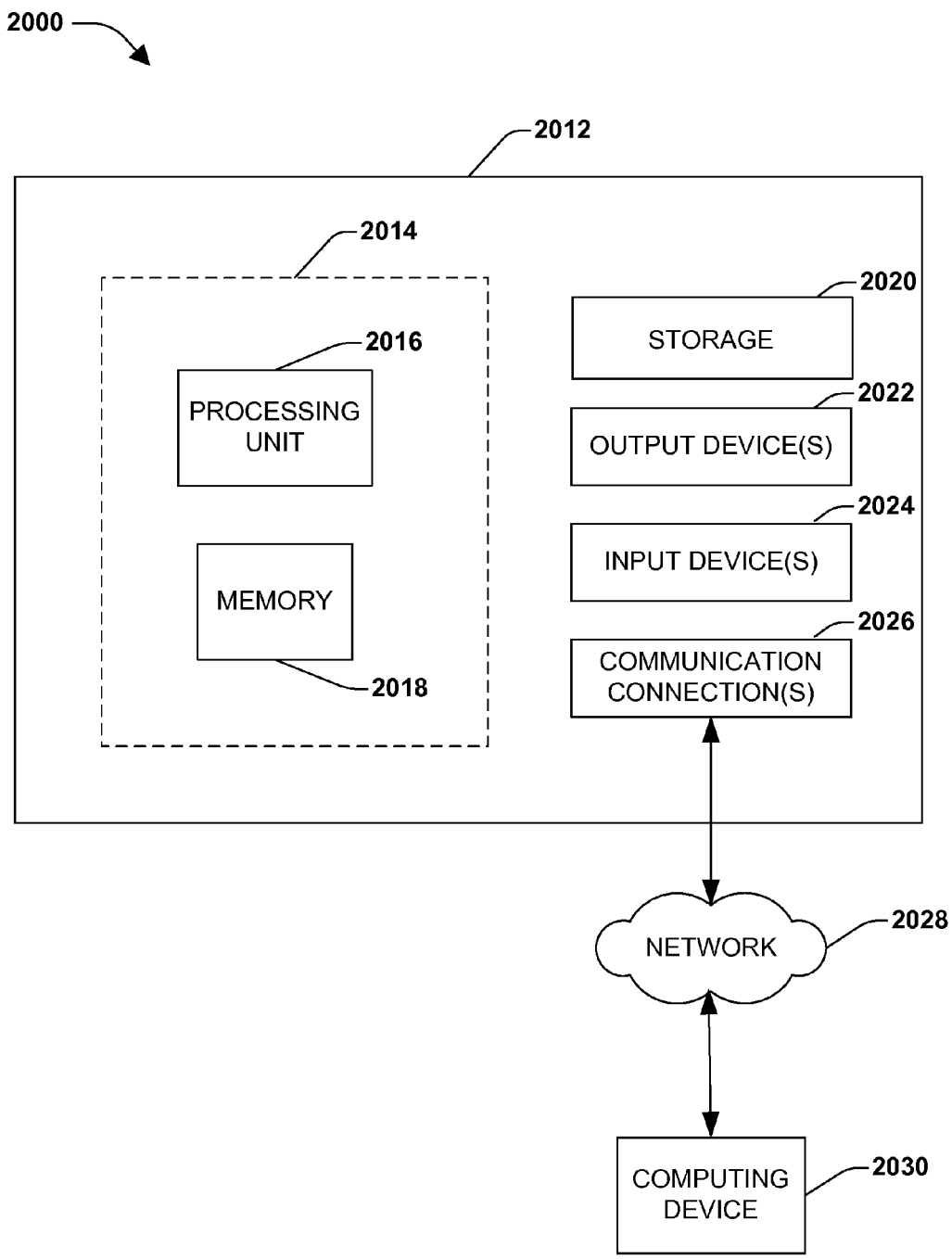
FIG. 20 illustrates an exemplary computing environment wherein one or more of the provisions set forth herein may be implemented.

FIG. 20 and the following discussion provide a brief, general description of a suitable computing environment to implement embodiments of one or more of the provisions set forth herein. The operating environment of FIG. 20 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 20 illustrates an example of a system 2000 comprising a computing device 2012 configured to implement one or more embodiments provided herein. In one configuration, computing device 2012 includes at least one processing unit 2016 and memory 2018. Depending on the exact configuration and type of computing device, memory 2018 may be volatile (such as RAM, for example), non-volatile (such as ROM, flash memory, etc., for example) or some combination of the two. This configuration is illustrated in FIG. 20 by dashed line 2014.

In other embodiments, device 2012 may include additional features and/or functionality. For example, device 2012 may also include additional storage (e.g., removable and/or non-removable) including, but not limited to, magnetic storage, optical storage, and the like. Such additional storage is illustrated in FIG. 20 by storage 2020. In one embodiment, computer readable instructions to implement one or more embodiments provided herein may be in storage 2020. Storage 2020 may also store other computer readable instructions to implement an operating system, an application program, and the like. Computer readable instructions may be loaded in memory 2018 for execution by processing unit 2016, for example.

The term "computer readable media" as used herein includes computer storage media. Computer storage media includes volatile and nonvolatile, removable and non-removable media implemented in any method or technology for storage of information such as computer readable instructions or other data. Memory 2018 and storage 2020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 2012. Any such computer storage media may be part of device 2012.

Device 2012 may also include communication connection(s) 2026 that allows device 2012 to communicate with other devices. Communication connection(s) 2026 may include, but is not limited to, a modem, a Network Interface Card (NIC), an integrated network interface, a radio frequency transmitter/receiver, an infrared port, a USB connection, or other interfaces for connecting computing device 2012 to other computing devices. Communication connection(s) 2026 may include a wired connection or a wireless connection. Communication connection(s) 2026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 2012 may include input device(s) 2024 such as keyboard, mouse, pen, voice input device, touch input device, infrared cameras, video input devices, and/or any other input device. Output device(s) 2022 such as one or more displays, speakers, printers, and/or any other output device may also be included in device 2012. Input device(s) 2024 and output device(s) 2022 may be connected to device 2012 via a wired connection, wireless connection, or any combination thereof. In one embodiment, an input device or an output device from another computing device may be used as input device(s) 2024 or output device(s) 2022 for computing device 2012.

Components of computing device 2012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 2012 may be interconnected by a network. For example, memory 2018 may be comprised of multiple physical memory units located in different physical locations interconnected by a network.

Those skilled in the art will realize that storage devices utilized to store computer readable instructions may be distributed across a network. For example, a computing device 2030 accessible via a network 2028 may store computer readable instructions to implement one or more embodiments provided herein. Computing device 2012 may access computing device 2030 and download a part or all of the computer readable instructions for execution. Alternatively, computing device 2012 may download pieces of the computer readable instructions, as needed, or some instructions may be executed at computing device 2012 and some at computing device 2030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for generating a bundle package for an application, the method being performed by one or more processors of a computer system, the method comprising:
    prior to receiving a bundle acquisition request to download the bundle package for the application:
        identifying assets of the application, the application's assets each including an assigned asset label, wherein asset label assignments are at least partially based on an identified relationship between 1) the application's assets and 2) characteristics of previously known client devices, whereby the application's assets are retrievable by performing a search on the asset labels using client device characteristic information;
        identifying one or more app packages for inclusion within the bundle package;
        identifying one or more resource packages for inclusion within the bundle package, the one or more resource packages being associated with the application's assets such that the one or more resource packages are retrievable by performing a different search on the asset labels, wherein the one or more resource packages are identified independently of the bundle acquisition request, and wherein each of the one or more resource packages comprises a resource package index that describes a content of a corresponding one resource package; and generating the bundle package to comprise the one or more app packages and the one or more resource packages, the bundle package comprising a first app package and a first resource package, the first app package comprising first application code configured to execute on a first computing environment, the first resource package comprising first supplemental data used to provide first optional user experience functionality for the application, the first resource package further comprising a first resource package index that describes the first supplemental data.

2. The method of claim 1, the bundle package comprising a second app package that comprises second application code configured to execute on a second computing environment.

3. The method of claim 1, the bundle package comprising a second resource package that comprises second supplemental data used to provide second optional user experience functionality for the application, the second resource package further comprising a second resource package index that describes the second supplemental data.

4. The method of claim 1, the one or more resource packages comprising optional language user experience functionality for the application.

5. The method of claim 1, the one or more resource packages comprising optional display quality user experience functionality for the application.

6. The method of claim 1, the first resource package comprising at least one of first resolution data, first screen scale data, or first multimedia application programming interface (API) version data.

7. The method of claim 1, wherein the method further comprises:
exposing portions of the bundle package for selective download through an app marketplace, the one or more resource packages exposed as optional downloads for the application.

8. The method of claim 1, wherein the generation of the bundle package comprises:
generating a bundle manifest for inclusion within the bundle package, the bundle manifest comprising one or more app descriptions for the one or more app packages and one or more resource descriptions for the one or more resource packages.

9. The method of claim 1, wherein the identification of the one or more resource packages comprises:
parsing the first app package to identify a first set of optional data within the first app package;
extracting the first set of optional data from the first app package; and
generating the first resource package based upon the first set of optional data.

10. The method of claim 1, wherein the one or more app packages are provided by an application developer, and wherein the method further comprises:
exposing a resource package outsourcing interface to the application developer;
receiving a resource package creation request from the application developer;
exposing the resource package creation request to a plurality of resource package developers through the resource package outsourcing interface;
receiving one or more resource package creation bids through the resource package outsourcing interface; and
responsive to receiving a selection of a first resource package creation bid from the application developer, facilitating a first resource package creation transaction between the application developer and a first resource package developer.

11. The method of claim 10, wherein the identification of the one or more resource packages comprises:
receiving the first resource package from the first resource package developer.

12. The method of claim 1, wherein the method further comprises:
receiving the bundle acquisition request from a client device, the bundle acquisition request specifying the first app package; and
selectively providing the first app package, but not the first resource package, from the bundle package to the client device for installation of the application.

13. The method of claim 1, wherein the bundle package comprises a second resource package, and wherein the method further comprises:
receiving the bundle acquisition request from a client device, the bundle acquisition request specifying the first app package and the second resource package; and
selectively providing the first app package and the second resource package, but not the first resource package, from the bundle package to the client device for installation of the application.

14. The method of claim 1, wherein the method further comprises:
receiving the bundle acquisition request from a client device, the bundle acquisition request specifying the first app package and a subset of resource packages comprised within the bundle package, the subset of resource packages specifying at least some but fewer than all of the one or more resource packages within the bundle package; and
selectively providing the first app package and the subset of resource packages from the bundle package to the client device for installation of the application.

15. The method of claim 1, wherein the method further comprises:
receiving a bundle update for the bundle package, the bundle update comprising a new resource package for inclusion within the bundle package;
updating the bundle package to comprise the new resource package; and updating a bundle manifest, within the bundle package, to specify that the new resource package is available for optional retrieval.

16. The method of claim 15, the bundle package certified by an app marketplace certification process, and the method further comprising:
responsive to the updating the bundle package, certifying the new resource package, but not re-certifying the bundle package.

17. A computer system comprising:
one or more processors; and
one or more computer-readable hardware storage devices having stored thereon computer-executable instructions, the computer-executable instructions being executable by the one or more processors to cause the computer system to generate a downloadable bundle package for an application by causing the computer system to prior to receiving a bundle acquisition request to download the bundle package for the application:
- identify assets of the application, the application's assets each including an assigned asset label, wherein asset label assignments are at least partially based on an identified relationship between 1) the application's assets and 2) characteristics of previously known client devices, whereby the application's assets are retrievable by performing a search on the asset labels using client device characteristic information,
- identify one or more app packages for inclusion within the bundle package;
- identify one or more resource packages for inclusion within the bundle package, the one or more resource packages being associated with the application's assets such that the one or more resource packages are retrievable by performing a different search on the asset labels, wherein the one or more resource packages are identified independently of the bundle acquisition request, and wherein each of the one or more resource packages comprises a resource package index that describes a content of a corresponding one resource package; and
- generate the bundle package to comprise the one or more app packages and the one or more resource packages, the bundle package comprising a first app package and a first resource package, the first app package comprising first application code configured to execute on a first computing environment, the first resource package comprising first supplemental data used to provide first optional user experience functionality for the application, the first resource package further comprising a first resource package index that describes the first supplemental data.

18. The computer system of claim 17, wherein execution of the computer-executable instructions further causes the computer system to:
- receive the bundle acquisition request from a client device, the bundle acquisition request specifying the first app package and a subset of resource packages that are included with the bundle package, the subset of resource packages including at least some, but fewer than all, of the one or more resource packages within the bundle package; and
- selectively provide the first app package and the subset of resource packages from the bundle package to the client device for installation of the application.

19. One or more hardware storage devices having stored thereon computer-executable instructions, the computer-executable instructions being executable by one or more processors of a computing system to cause the computing system to generate a downloadable bundle package for an application by at least causing the computer system to:
- identify assets of the application, the application's assets each including an assigned asset label, wherein asset label assignments are at least partially based on an identified relationship between 1) the application's assets and 2) characteristics of previously known client devices, whereby the application's assets are retrievable by performing a search on the asset labels using client device characteristic information,
- receive a bundle acquisition request from a client device, the bundle acquisition request specifying a bundle package, a first app package, and one or more referenced resource packages in the same bundle acquisition request, wherein each of the one or more referenced resource packages comprises a resource package index that describes a content of a corresponding one resource package, and wherein the one or more referenced resource packages are associated with the application's assets such that the one or more references resources packages are retrievable by performing a different search on the asset labels;
- identify the bundle package based upon the bundle acquisition request, the bundle package comprising the first app package, the one or more referenced resource packages, and one or more non-referenced resource packages that are not specified by the bundle acquisition request; and
- selectively provide the first app package and the one or more referenced resource packages, but not the one or more non-referenced resource packages, to the client device for installation of an application represented by the bundle package.

20. The one or more hardware storage devices of claim 19, wherein the bundle package includes the following:
- a first referenced resource package of the one or more referenced resource packages corresponding to at least one of first language user experience data, first resolution data, first screen scale data, or first multimedia application programming interface (API) version data; and
- a first non-referenced resource package of the one or more non-referenced resource packages corresponding to at least one of second language user experience data, second resolution data, second screen scale data, or second multimedia API version data.

21. The computer system of claim 17, wherein each resource package index is mergeable with another resource package index to create a merged resource package index.

22. The computer system of claim 21, wherein the bundle package further includes a second resource package with a corresponding second resource package index, and wherein a merge between the first resource package index and the second resource package index occurs while the first resource package and the second resource package are being deployed to a client device.

23. The computer system of claim 17, wherein execution of the computer-executable instructions further causes the computer system to:
- independently place a digital signature on the bundle package;
- independently place the digital signature on the one or more app packages; and
- independently place the digital signature on the one or more resource packages,
- whereby the independently digitally signed one or more app packages and the independently digitally signed one or more resources packages are included within the independently digitally signed bundle package.

* * * * *